United States Patent [19]

Bui

[11] Patent Number: 5,528,528
[45] Date of Patent: Jun. 18, 1996

[54] METHOD, APPARATUS, AND SYSTEM FOR TRANSFORMING SIGNALS

[75] Inventor: Tuan H. Bui, Phoenix, Ariz.

[73] Assignee: Intel Corporation, Santa Clara, Calif.

[21] Appl. No.: 498,526

[22] Filed: Jul. 5, 1995

Related U.S. Application Data

[63] Continuation of Ser. No. 380,252, Jan. 30, 1995, abandoned, which is a continuation of Ser. No. 168,846, Dec. 17, 1993, abandoned, which is a continuation of Ser. No. 38,468, Mar. 29, 1993.

[51] Int. Cl.$^6$ .................................................. G06F 17/14
[52] U.S. Cl. ............................................................ 364/725
[58] Field of Search .............................. 364/724.13, 725, 364/726, 727

[56] References Cited

U.S. PATENT DOCUMENTS

| | | | |
|---|---|---|---|
| 5,029,122 | 7/1991 | Uetani | 364/725 |
| 5,204,828 | 4/1993 | Kohn | 364/736 |
| 5,249,146 | 9/1993 | Uramoto et al. | 364/725 |
| 5,253,192 | 10/1993 | Tufts | 364/726 |

Primary Examiner—Roy N. Envall, Jr.
Assistant Examiner—Chuong D. Ngo
Attorney, Agent, or Firm—William H. Murray; N. Stephan Kinsella

[57] ABSTRACT

A transform coefficient matrix is factorized in two submatrices of coefficients. One submatrix is applied to a subword formed of selected input data points and the other submatrix is applied to a subword formed of other selected input data points. This provides two sets of transformed output words. These transformed output data words are then combined. The two subwords may include, respectively, the odd data points and the even data points of the input data word. Alternately, the two subwords may include the high order data points and the low order data points. The transform performed by these operations may be the forward discrete cosine transform or the inverse discrete cosine transform. The submatrices of coefficients may be applied to differences of data points as well as to sums of data points. The differences and sums of data points may be applied to the submatrices of transform coefficients by the use of respective circular buffers.

12 Claims, 10 Drawing Sheets

METHOD, APPARATUS, AND SYSTEM FOR TRANSFORMING SIGNALS

This is a continuation of application Ser. No. 08/380,252 filed on Jan. 30, 1995, now abandoned, which is a continuation of application Ser. No. 08/168,846 filed on Dec. 17, 1993, now abandoned, which is a continuation of application Ser. No. 08/038,468 filed on Mar. 29, 1993.

BACKGROUND OF THE INVENTION

1. Field of the Invention

This invention relates to the field of video processing and, in particular, to the compression and decompression of video signals.

2. Background Art Statement

It is well known to perform loop filtering within video compression and decompression these systems. For example, it is known to provide a two-dimensional spatial filter which operates on pels within a predicted eight-by-eight block. The filter is separable into two one-dimensional functions, horizontal and vertical. Both the horizontal function and the vertical function are nonrecursive with coefficients of one-quarter, one-half and one-quarter except at block edges where one of the tags would fall outside the block. In such cases the one-dimensional filter is altered to have coefficients zero, one and zero. Full arithmetic precision is retained with rounding to eight bit integer values at the two-dimensional filter output.

In addition, it is well known to provide quantization within these systems. In a typical system the number of quantizations may be one for the intrablock encoded DC coefficient and thirty-one for all other coefficients. Within a macroblock the same quantization is used for all coefficients except the intrablock encoded DC quantization. The decision levels may not be defined. The intrablock encoded dc coefficient is nominally the transform value linearly quantized with a step size of eight and no dead zone. Each of the other thirty-one quantizations is also nominally linear but with a central dead zone around zero and with a step size of an even value in the range two to sixty-two. In these systems the full dynamic range of the transformed coefficients cannot be represented for smaller quantization step sizes.

To prevent quantization distortion of transformed coefficient amplitudes causing arithmetic overflow in the encoder and decoder loops, clipping functions are sometimes inserted. The clipping functions are applied to the reconstructed image which is formed by summing the prediction and the prediction error as modified by the coding process. This clipper operates on resulting pel values less than zero or greater than two hundred fifty-five, changing them to zero and two hundred fifty-five respectively.

Values that are quantized in this manner may be dequantized in the following manner. For all coefficients other than the intrablock encoded DC quantization the reconstruction levels, REC, are in the range of −2048 to 2047 and are given by clipping the results of the following equations:

$$REC=QUANT*(2*LEVEL+1); LEVEL>0 \; QUANT=\text{``odd''}$$

$$REC=QUANT*(2*LEVEL-1); LEVEL<0 \; QUANT=\text{``odd''}$$

$$REC=QUANT*(2*LEVEL+1)-1; LEVEL>0 \; QUANT=\text{``even''}$$

$$REC=QUANT*(2*LEVEL-1)+1; LEVEL<0 \; QUANT=\text{``even''}$$

$$REC=0; LEVEL=0$$

Where QUANT ranges from one to thirty-one. These reconstruction levels are symmetrical with respect to the sign of LEVEL except for the values 2047 and −2048.

In the case of blocks which are intrablock encoded the first coefficient is nominally the transform DC value linearly quantized with a step size of eight and no dead zone. The resulting values are represented with eight bits. A nominally black block provides the value 0001 0000 and a nominally white block yields 1110 1011. The codes 0000 0000 and 1000 0000 are not used. The reconstruction level of 1024 is coded as 1111 1111. Coefficients after the last non-zero one are not transmitted.

It is also know to provide both hardware and software forward and inverse discrete cosine transforms in these systems. When hardware is provided for this purpose space is wasted on the integrated circuit chip because only one transform is performed at a time. Thus space on the chip is always taken up by a transform circuit which is not in use.

It is common to perform these discrete cosine transforms using a number of multipliers and adders. For example it is known to perform an eight point fast discrete cosine transform in a single clock cycle using twelve multipliers and twenty-nine adders. It is also known to perform it in more clock cycles using less hardware. These different transform devices are useful for different applications. For example many high quality video applications require great speed and a great deal of space for transform hardware may be provided. In other applications, for example, video conferencing great speed is not required and it is preferred to provide more efficient use of hardware application.

SUMMARY OF THE INVENTION

A transform coefficient matrix is factorized in two submatrices of coefficients. One submatrix is applied to a subword formed of selected input data points and the other submatrix is applied to a subword formed of other selected input data points. This provides two sets of transformed output words. These transformed output data words are then combined. The two subwords may include, respectively, the odd data points and the even data points of the input data word. Alternately, the two subwords may include the high order data points and the low order data points. The transform performed by these operations may be the forward discrete cosine transform or the inverse discrete cosine transform. The submatrices of coefficients may be applied to differences of data points as well as to sums of data points. The differences and sums of data points may be applied to the submatrices of transform coefficients by means of respective circular buffers.

DETAILED DESCRIPTION OF THE INVENTION

Figure 1:
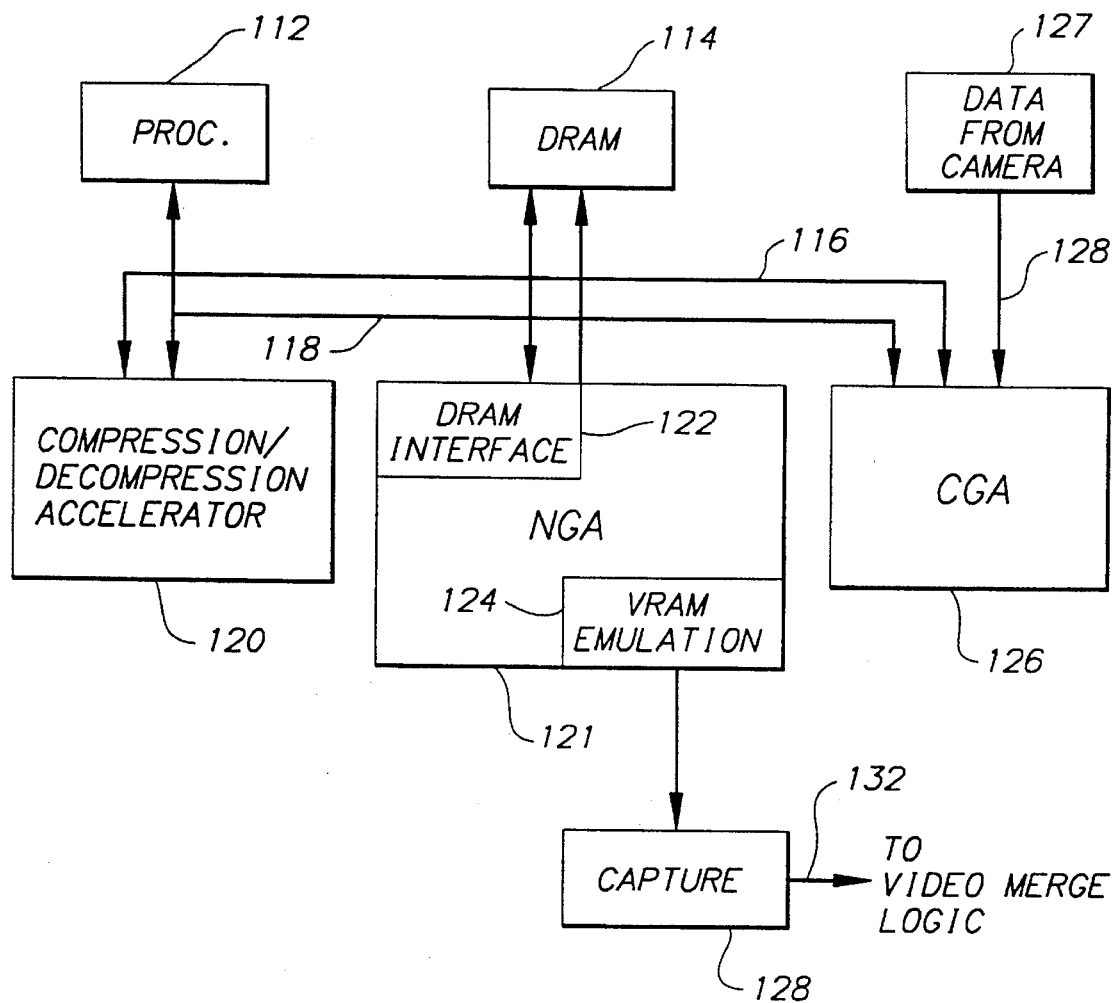
FIG. 1 shows a block diagram representation of a video processing system including a system and method for accelerating the compression and decompression of digital video signals of the present invention.

Referring now to FIG. 1, there is shown remote video processing system 100 including compression/decompression accelerator 120. The bus structure of remote video processing system 100, including address bus 116 and data bus 118, permits easy interconnection of the components of a multimedia display system without using a host processor bus. For example, the local video data of video camera 127 may be received by video processing system 100 by way of line 128, captured by CGA 126, and processed by system 100 for transmission to video merge logic by way of system output line 132 without use of a host processor bus.

Within video processing system 100 video processor 112 performs software processing and nucleus gate array 121 performs the required memory interface functions. For example, VRAM emulation block 124 makes nucleus gate array 121 function like DRAM with respects to CGA 126. Video processing system 100 is therefore limited to the memory configurations supported by nucleus gate array 121.

In a typical configuration of remote video processing system 100 up to sixteen megabytes of address space may be supported. The first fifteen megabytes of this address space may be reserved for DRAM, for example, DRAM 114, which is interfaced with nucleus gate array 121 by DRAM interface 122 The upper one megabyte of the memory space of video processing system 100 is reserved for communication between various devices which may be coupled to address bus 116 and data bus 118. Compression/decompression accelerator 120 may occupy the first one hundred twenty-eight kilobytes of the communication area in the upper one megabyte of memory space.

Compression/decompression accelerator 120 is not required to decode all of the available one hundred twenty-eight kilobyte address space because the area is well in excess of the requirement for an internal register map. Accelerator 120 may be an initiator or a target in a bus transaction within remote video interface system 100. When accelerator 120 initiates actions it fetches thirty-two bit words from memory. When accelerator 120 is a target it responds to all scaler accesses or addresses in its range.

The bus structure of remote video interface system 100 may use a daisy chain priority scheme for bus arbitration. In this scheme compression/decompression accelerator 120 may request access to buses 116, 118 through nucleus gate array 121. In the preferred embodiment accelerator 120 is the last connection in the daisy chain it has the lowest priority.. Thus, bursts initiated by accelerator 120 may be aborted in the middle of a burst by another device. This type of abort due to another device typically occurs when a display system controlled by nucleus gate array 121 requires display data. Under such circumstances compression/decompression accelerator 120 must relinquish buses 116, 118 before the beginning of the following cycle. Accelerator 120 later requests buses 116, 118 and, after gaining access by the normal arbitration process, resumes the interrupted burst beginning at the last address accessed.

Figure 2:
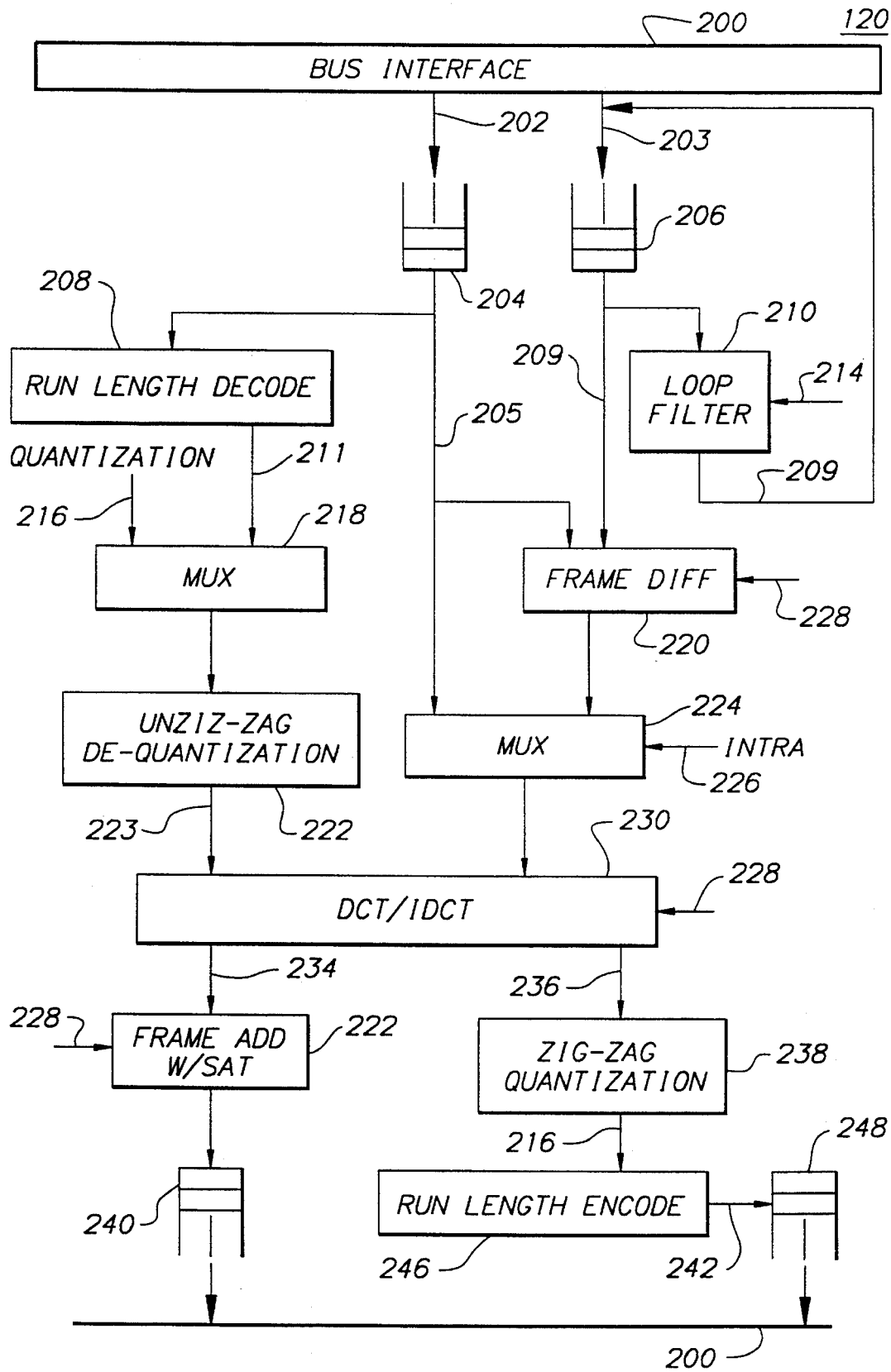
FIG. 2 shows a block diagram representation of the system and method for accelerating the compression and decompression of video digital signals of the present invention.

Referring now to FIG. 2, there is shown a more detailed block diagram representation of compression/decompression accelerator 120 of the present invention within remote video interface system 100 having a straight pipeline architecture rather than shared resources. Compression/decompression accelerator both system 120 may be selectably operated in an encode mode and in a decode mode in accordance with digital control signals. These two modes are effective to perform and thereby accelerate both encode operations and decode operations performed upon data transmitted by way of data bus 118 of video processing system 100.

Data transmitted by way of data bus 118 of remote video interface system 100 is received by bus interface 200 of compression/decompression accelerator 120. All RAM within acceleration 120 must read and write by way of bus interface 200. When accelerator 120 functions in the encoder mode a previous image block, or reference frame, as received by bus interface 200 may be stored in loop filter memory 206 or previous block memory 206. This data may be applied to selectable loop filter 210 for filtering prior to being applied to frame difference block 220 depending upon whether selectable loop filter 210 is enabled. In the preferred embodiment selectable loop filter 210 may be formed of a small RAM with separate read and write ports, a three stage adder and feedback. The enabling of selectable loop filter 210 is controlled by loop filter control line 214.

Selectable loop filter 210 of accelerator 120, which is enabled by asserting a control signal by way of loop filter control line 214, may be a two-dimensional 1-2-1 filter applied to the interior of an eight-by-eight pixel block. In the preferred embodiment of compression/decompression accelerator 120 the filter coefficients of loop filter 210 may be as shown in Table I.

TABLE I

| 1 | 2 | 1 |
|---|---|---|
| 2 | 4 | 2 |
| 1 | 2 | 1 |

Selectable loop filter 210 may be applied to various areas of the stored image in loop filter memory 206. These areas are as shown in Table II. The outer rows and columns of an eight-by-eight pixel block from the image being filtered within loop filter 210 are filtered only in one direction except at the corners. The pixel positions receiving this filtering in only one direction are indicated by ones in Table II, The pixels at the corners of the pixel block filtered are not affected by selectable loop filter 210. This is indicated in Table II by zeros, The remaining pixels in the interior of the block are filtered in both directions, The pixels which are filtered in two directions are indicated by the twos in Table II.

TABLE II

| 0 | 1 | 1 | 1 | 1 | 1 | 1 | 0 |
|---|---|---|---|---|---|---|---|
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 0 | 1 | 1 | 1 | 1 | 1 | 1 | 0 |

The reference frame data of memory 206 is applied to frame difference block 220 by way of line 209 either with or without filtering by selectable loop filter 210, A frame subtraction is performed in difference block 220 when compression/decompression accelerator 120 performs motion estimation encoding. In the subtraction of frame difference block 220, the information of reference frame line 209 is subtracted from the current frame information on line 205 and the difference between the two frames is provided for encoding. The information on current frame line 205 is received into current frame memory 204 from bus interface 200 by way of line 202. This frame subtraction of frame difference block saturates the resulting image values to a signed number between negative and positive two hundred fifty-five.

The output of frame difference block 220 is multiplexed with the information applied directly by line 205 by transform multiplexer 224. Transform multiplexer 224 is controlled by multiplexer control line 246. It will be understood that the state of control line 246 depends upon whether the image block being processed is intrablock encoded or motion estimation encoded. The output of transform multiplexer 224 is then encoded by means of a forward discrete cosine transform operation performed within selectable discrete cosine transform block 230 in compression/decompression accelerator 100. Selectable discrete cosine transform block 230, or reconfigurable direct cosine transform block 230, may perform either a forward or an inverse discrete cosine transform depending on the signal applied to transform block 230 by transform control line 228.

The transformed data from selectable discrete cosine transform block 230 is then applied to zig-zag quantization block 238 for quantization in a conventional zig-zag order. It will be understood that the need for intermediate storage is eliminated by quantizing in zig-zag order rather than putting the data into zig-zag order and reading the data into quantization block 238. This zig-zag quantization is performed by indexed reading of the data from the matrix being quantized. This permits true pipelining within accelerator 120.

One basic formula for quantization by quantization block 238 within compression/decompression accelerator 120 of the present invention may be:

$$\text{value}=d/(2\times Q) \quad \text{Equation (1)}$$

where value is the quantized value which appears on quantization output line 216 of quantization block 238, d is the input applied to quantization block 238 by selectable transform block 230, and Q is the quantization multiplier. Accelerator 120 performs the division of Equation (1) by performing a table look up and providing an eight bit value R which is given by the formula:

$$R=256/(2\times Q)$$

Accelerator 120 then performs the following operation:

$$\text{value}=(d\times R)>>8$$

If the coefficient is a DC term and the block is intrablock encoded:

$$\text{value}=255 \text{ if } (d \text{ is } 1024)$$

else $$\text{value}=d>>3.$$

The quantized output data from zig-zag quantization block 238 is applied by way of quantization output line 216 to run length encoder block 246 for conventional run length encoding within compression/decompression accelerator 120. The output of run length encoder block 246 is applied to run/value store buffer 248 by way of encoder output line 242.

It will be understood that during the encoding process of compression/decompression accelerator 120 quantized data from quantization block 238 may also be applied by way of quantization output line 216 to dequantization multiplexer 218 and, therefrom, to zig-zag dequantization block 222. Thus quantization block 238 and dequantization block 22 are directly coupled within accelerator 120. This data, which was zig-zag encoded in quantization block 238, may be applied to zig-zag dequantization block 222 in a sequence adapted to reestablish the order of the data prior to the zig-zag encoding. This eliminates the need for the intermediate storage which is conventionally required to hold the re-ordered data. Thus, the data which is encoded in selectable discrete cosine transform block 230 and zig-zag encoded and quantized in quantization block 238 may be immediately dequantized during the encoding process of accelerator 120 by dequantization block 222 by way of quantizer output line 216.

The dequantization operation of dequantization block 222 may use the formula of Equations (2):

$$d=Q\times(2\times\text{value}+\text{sign}(\text{value})) \quad \text{Equations (2)}$$

$$d=d-\text{sign}(d) \text{ if } (d \text{ is even})$$

In this formula value is the quantized input data applied to dequantization block 222 either by multiplexer input line 216 from quantization block 238 or by multiplexer input line 211, Q is the quantization multiplier as previously described, and d is the dequantized result which appears on output line 223 of dequantization block 222.

In a case wherein the transform coefficient corresponds to a DC term and the block being dequantized within dequantization block 222 is intrablock coded, the dequantization formula is as set forth in Equations (3).

$$d=1024 \text{ if } (\text{value is } 255)$$

else $$d=8\times\text{value} \quad \text{Equations (3)}$$

The data which is dequantized within dequantization block 222 is applied to selectable discrete cosine transform block 230 by dequantization output line 223. As previously described, selectable transform block 230 is effective to selectively apply either a forward or a inverse discrete cosine transform to received signals according to transform control line 228. The inverse discrete transform is applied by selectable transform device 230 to the data received from unzig-zag dequantization block 222.

The inverse transformed signal provided by this operation is applied to frame add block 222. Frame add block 222 adds back in the value on line 209 which was subtracted out by frame difference block 220 during the encode process. Frame addition saturates a number to a value between zero and positive two hundred fifty-five. It will be understood that frame difference block 220 and frame add block 228 may be reconfigurations of the same circuitry under the control of transform control line 228 because they are not active at the same time and there is enough latency to allow time to reconfigure and add/subtract circuitry. The output of frame add block 234 is stored in decoded block storage buffer 240. Thus, while operating in the encode mode compression/decompression accelerator 120 provides both an encoded signal in buffer 248 and a decoded version of the encoded signal in buffer 240. This permits system 100 to determine the errors which are decoded by a remote system receiving the encoded data.

When transform control line 228 adapts compression/decompression accelerator 120 to operate in the decode mode, the data to be decoded is received from data bus 118 into bus interface 200. This data to be decoded in bus interface 200 has previously been zig-zag encoded and run length encoded. It is therefore applied to or run length decoder block 208. This data is applied by way of dequantization multiplexer 218 to dequantization block 222 where it is reordered to undo the effects of zig-zag encoding as previously described.

Blocks 238, 222 translate the row order of the transformed coefficients, respectively, into order of increasing spatial frequency and out of the order of increasing spatial frequency. Placing the coefficients into this order is a useful prelude to run length encoding because it tends to group coefficients of similar spatial frequency together. The scanning order of the coefficients used to apply data to quantization block 238 of accelerator 120 is set forth in Table III wherein a zig-zag pattern is followed from the upper left to the lower right. The run length encode process of block 246 is a straight forward compression of the value string to a group of run/value pairs. The run length is calculated by counting up to but not including the value.

TABLE III

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 52 | 57 | 60 | 62 |
| 36 | 37 | 49 | 50 | 58 | 59 | 63 | 64 |

Run length decoded data from run length decoder block 208 is applied by way of multiplexer input line 211 and dequantization multiplexer 218 to dequantization block 222 where it is dequantized. The dequantized data from dequantization block 222 is then applied to selectable discrete cosine transform block 230.

It will be understood that dequantization multiplexer is controlled to select multiplexer input line 211 for application to selectable transform device 230 when compression/decompression accelerator 120 is operating in the decode mode and to select quantization output line 216 at the appropriate times when accelerator 120 is operating in the encode mode. Thus dequantization multiplexer 218 selects the externally encoded data from bus interface 206 when in the decode mode and the internally encoded data otherwise.

Figure 3:
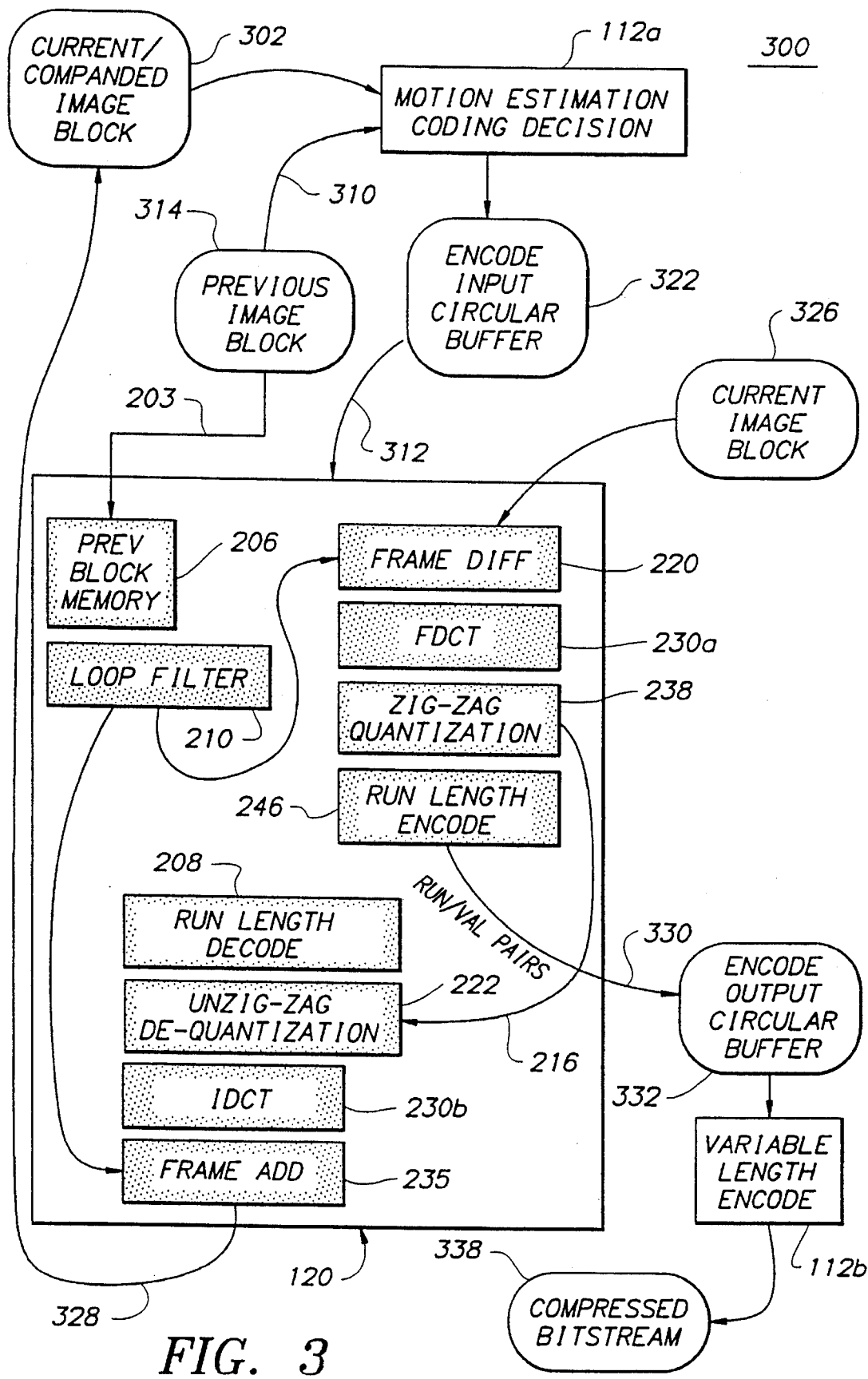
FIG. 3 shows a block diagram representation of the dataflow of the system and method of FIG. 2 when it is adapted to encode digital video signals.

Referring now to FIG. 3, there is shown encode dataflow 300 for performing encoding of data within compression/decompression accelerator 120 of the present invention. Within encode dataflow 300 current image block 302 is applied to motion estimation block 112a for a coding decision in order to permit system 100 to transmit as little data as possible. For this purpose, it will be understood that it is sometimes more efficient to estimate the displacement between one frame and the next and transmit only the displacement. This is understood to be motion estimation encoding. However, if there is a great deal of difference between frames, it is less efficient to transmit the displacement and the block is encoded based only upon itself. This is understood to be intrablock encoding. This decision is made by software coding decision block 112a.

Thus, within motion estimation block 112a a determination is made whether current image 302 is to receive intrablock encoding or motion estimation encoding. If the decision is made to encode current block 302 using intrablock encoding execution proceeds to accelerator 120 by way of line 312. If motion estimation is to be performed the block to be encoded is stored in encode input circular buffer 322. Thus, it will be understood that encode dataflow 300 represents a loosely coupled system. It is from encode input circular buffer 322 that current image block 322 is applied to compression/decompression accelerator 120 for motion estimation encoding.

Frame difference block 220 within accelerator 120 receives the data of current image block 326 and a difference is determined within frame difference block 220 as previously described. A forward discrete cosine transform is then performed on the data from frame difference block 220 in encode dataflow 300 by forward discrete cosine transform block 230a. It will be understood that the function of forward discrete cosine transform block 230a may be performed by selectable discrete cosine transform block 230 when selectable transform block 230 operates in the encode mode as determined by transform control line 228.

The transformed data from forward discrete cosine transform block 230a is received by quantization block 238 in a conventional zig-zag order as previously described and quantized therein. The quantized data from block 238 is applied by way of quantization output line 216 to or run length encoder 246 for run length encoding. Run length decoding within encoder 246 provides conventional run/value pairs as known to those skilled in the art. The run/value pairs from run length encoder 246 are applied, by way of line 330, to encode output circular buffer 332.

The data within encode output circular buffer 332 is then applied to variable length encoder 112b to provide compressed bit stream 338. It will be understood that the motion estimation decision of motion estimation block 112a and the variable length encode of variable length encoder 112b may both be performed by video processor 112 of system 100. A video processor system suitable for this purpose is the 82750 PB made by Intel Corporation. It will also be understood that the data of motion estimation block 112a and variable length encode 112b may occupy the same space in physical memory. Thus the functions of encode dataflow 300 are partitioned as follows: (1) the software functions motion estimation and Huffman encoding/decoding are performed by processor 112, and (2) the remaining functions are hard-wired in accelerator 120. This dual execution scheme permits the use of low cost DRAM in place of more expensive VRAM.

The quantized data from quantization block 238 is also applied to dequantization block 222 by way of quantization output line 216. The data transferred in this manner within compression/decompression accelerator 120 thus bypasses both run length encoding within run length encoder block 246 and run length decoding within run length decoder block 208. It will be understood by those skilled in the art that the operations of run length blocks 208, 246 are not lossy operations and that their contribution to the motion estimation decoding decision of motion estimation block 112a may therefore be ignored.

Inverse discrete cosine transform block 230b applies an inverse transform to the dequantized data received from dequantization block 222. It will be understood that the operations of inverse discrete cosine transform block 230b of encode dataflow 300 may be performed by selectable discrete cosine transform block 230 when transform block 230 operates in the decode mode under the control of transform control line 228. Thus during the decode process within compression/decompression accelerator 120, as described by encode dataflow 300, selectable transform block 230 may function both as a forward and an inverse discrete cosine transform under the control of transform control line 228.

The decoded signal from inverse transform block 230b is applied to frame addition block 234, and, therefrom, to current/companded image block 302 by way of line 328. It will be understood that the signal of line 328 resulting from encoding and decoding within encode dataflow 300 of accelerator 120 is the image which is compared with the previous image of previous image block 314 in order to make the motion estimation coding decision of block 112a. A useful and advantageous feature of encode dataflow 300 is that the current image is overwritten by the decoded image of line 328 thereby eliminating the need for one buffer.

Figure 4:
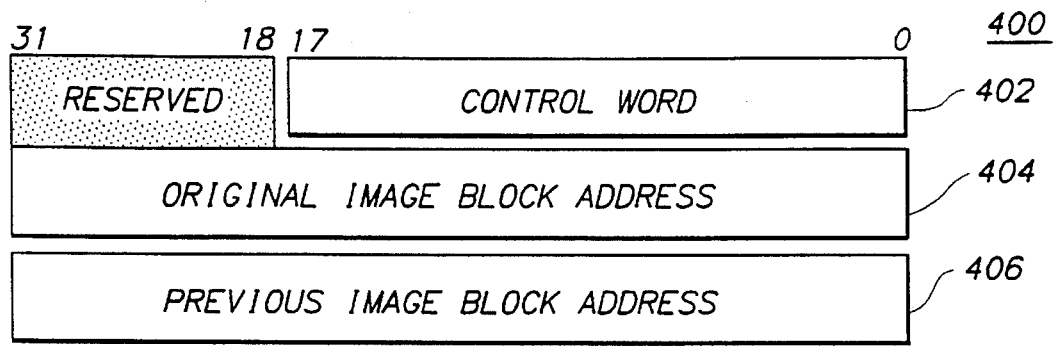
FIG. 4 shows a block diagram representation of a data structure for the input circular buffer of the encode dataflow of FIG. 3.

Referring now to FIG. 4, there is shown encode input buffer data structure 400 for controlling blocks of data stored in encode input circular buffer 322 as required within encode dataflow 300. Within encode input buffer data structure 400 control word 402 is provided. When motion estimation coding decision block 112a determines how an image should be encoded a bit within control word 402 may be used to indicate whether the block is intrablock encoded or a motion compensation encoded. Other parameters associated with each block of data may also be stored in control word 402 of data structure 400. Another example of the type of information which may be stored within control word 402 is information on whether selectable loop filter 210 is enabled or disabled. Additionally the five-bit quantization/dequantization value Q of blocks 222, 238 may be stored in control word 402 of data structure 400.

Encode input buffer data structure 400 also contains original image block address pointer 404. Original image block address pointer 404 points to the original location of a block of data in data encode output circular buffer 322. Similarly, previous image block address pointer 406 points to the output destination of the block.

Figure 5:
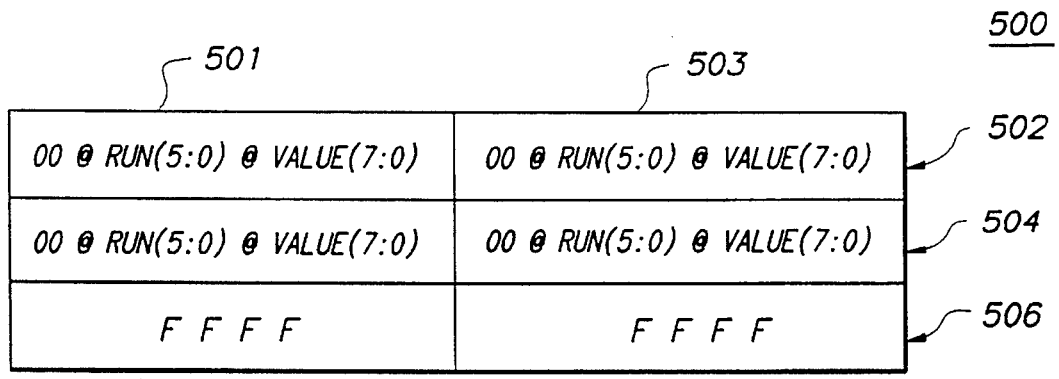
FIG. 5 shows a block diagram representation of a data structure for the output circular buffer of the decode dataflow of FIG. 3.

Referring now to FIG. 5, there is shown encode output buffer data structure 500 for encode output circular buffer 322 within encode dataflow 300. In the preferred embodiment of compression/decompression accelerator 120 two input run/value pairs such as run/value pairs 501, 503 may be stored in a single byte of input circular buffer 322, such as bytes 502, 504. Byte 506 of input circular buffer 322 is filled with ones to indicate the end of a list of run/value pairs.

Figure 6:
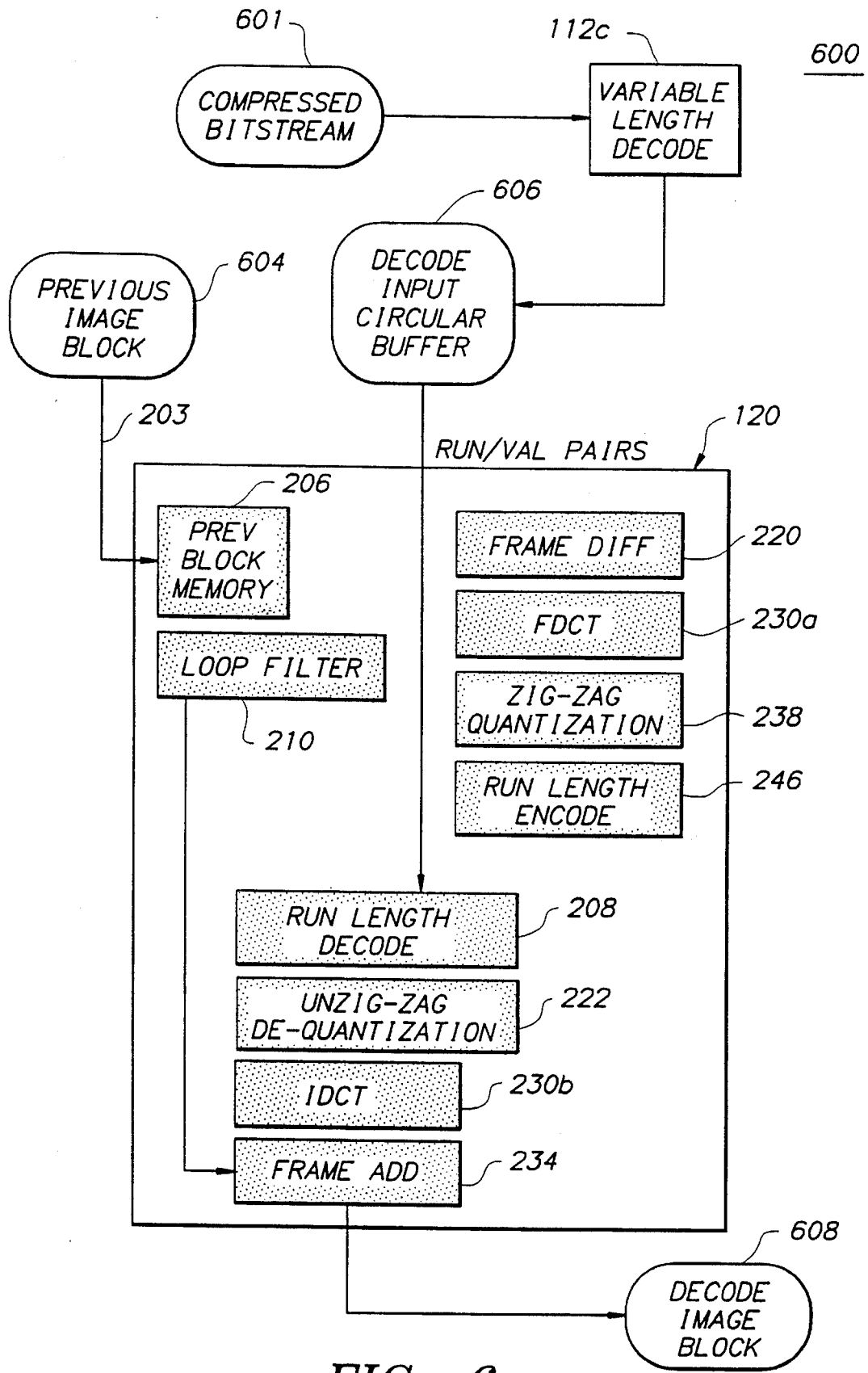
FIG. 6 shows a block diagram representation of the dataflow of the system and method of FIG. 2 when it is adapted to decode digital video signals.

Referring now to FIG. 6, there is shown decode dataflow 600 using compression/decompression accelerator 120 of the system of the present invention. Compressed bit stream 601 is received and decompressed within decode dataflow 600. Compressed bit stream 601 may be a bit stream such as compressed bit stream 338 provided by encode dataflow 300 of the present invention. A variable length decode is performed upon received bitstream 338 by variable length decoder 112c. It will be understood that variable length decoder 112c of decode dataflow 600 and variable encoder 112a of encode dataflow 300 may be performed by a single dual purpose encoding and decoding device within video processing system 100 such as processor block 112. The decoded data of variable length decoder 602 is then placed into decode input circular buffer 606 of decode dataflow 600.

Frame difference block 220, forward discrete cosine transform 230a, quantization block 246 and run length encoder 246 are not used within compression/decompression accelerator 120 when acceleration 120 operates in the decode mode. When operating in the decode mode accelerator 120 receives the data for decoding according to decode dataflow 600 from decode input circular buffer 606. In particular, run length decoder 208 of accelerator 120 receives the data from circular buffer 606. The data decoded within run length decoder 208 is then applied to dequantization block 222 for a dequantization within accelerator 120. This data is applied to dequantization block 222 in an order which is adapted to restore the sequence of the data prior to zig-zag encoding by an external zig-zag encoder (not shown).

An inverse discrete cosine transform is applied to the dequantized data of block 222 by inverse discrete cosine transform block 230b. It will be understood that the operations of inverse discrete cosine transform block 230b within decode dataflow 600 may be performed by selectable transform block 230 when selectable transform block 230 is in the decode mode as determined by transform control line 228.

Previous image block 604 is received by compression/decompression accelerator 120 by way of line 203. The received previous image block 604 is stored in previous block memory 206 within accelerator 120. If selectable loop filter 210 is enabled under the control of filter control line 214 the image in previous block memory 206 is filtered and applied to frame add block 234. If selectable loop filter 210 is not enabled the image within previous block memory 206 is applied directly to frame add block 234. When the previous image block 604, as received from previous block memory 206, and the dequantized transformed current image block are added in frame add block 234, the output of block 234 is stored in decoded image block 608.

Figure 7:
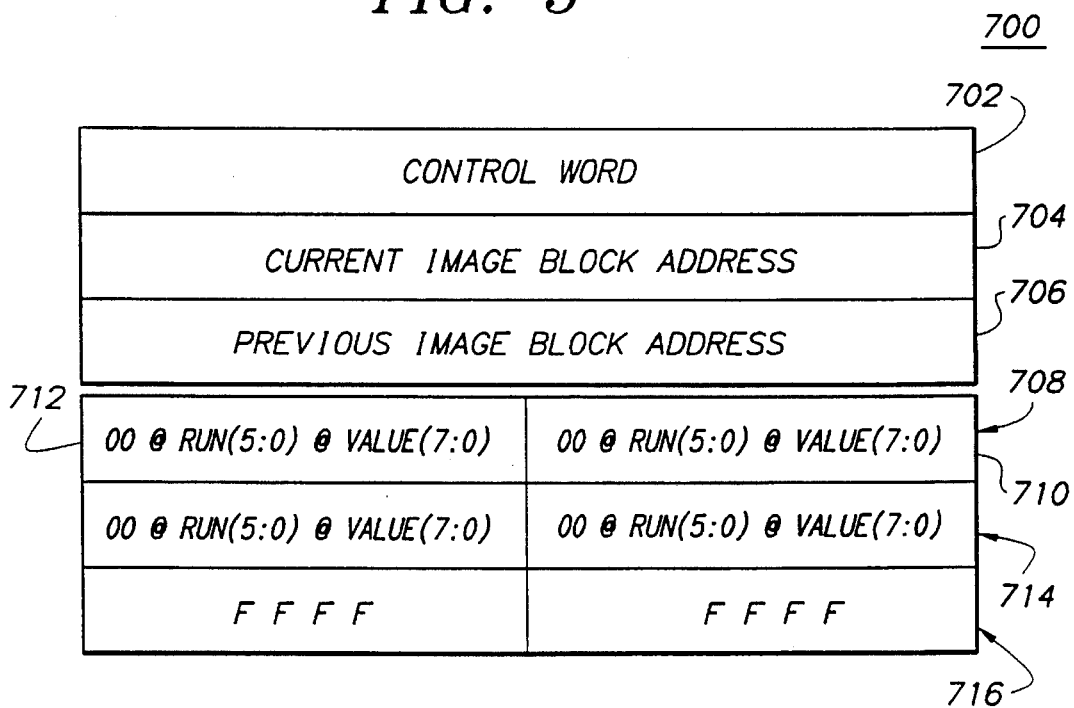
FIG. 7 shows a block diagram representation of a data structure for the input circular buffer of the decode dataflow of FIG. 6.

Referring now to FIG. 7, there is shown decode input circular buffer data structure 700 for decode input circular buffer 606 of decode dataflow 600. Decode input buffer data structure 700 contains control word 702 which may be used to store the quantization/dequantization valve Q as well as information regarding whether selectable loop filter 210 is enabled or disabled. Additionally control word 702 may contain information regarding whether the image block being decoded by decode dataflow 600 is a intracoded block or a motion compensated block. Current image block address 704 of data structure 700 points to the beginning of a current image and previous image block 706 points to the previous image.

Additionally, in the preferred embodiment of data structure 700 two run/value pairs, such as run/value pairs 710, 712 may be stored in each of a number of single bytes of circular buffer 606, such as bytes 708, 710. Byte 716 of circular buffer 606 is filled with ones to indicate the end of the list of run/value pairs.

It will be understood that motion estimation coding decision block 112a performs the motion estimation process within encode dataflow 300. Additionally, it performs the variable length encode of the local image and the variable length decode of remote compressed bit stream 601. Compression/decompression accelerator 120 of the present invention performs all of the remaining functions of encode dataflow 300 and decode dataflow 600.

Block 112 and accelerator 120 of video processor 100 operate substantially independently of each other. However, they tend to work from common areas of memory to implement the various circular buffers. The partitioning of the work load of block 112 and compression/decompression accelerator 120 minimizes the overhead required for synchronization of the dataflows. Nevertheless, some possibilities for conflict still exist within video processing system 100. For example, during operation of encode dataflow 300 a block list information is stored in a circular buffer area in memory by block 112. Accelerator 120 independently reads this same circular buffer area. Thus, there must be a method within video processing system 100 to manage the buffer area such that buffer overflows and underflows due to conflicts between block 112 and accelerator 120 are avoided.

In order to minimize costly fine tuning of synchronization within remote video interface system 100 a pointer interlock scheme is used for reading and writing the run/value data in the encode dataflow 300 and decode dataflow 600. To implement this both an encode synchronization and a decode synchronization are provided within remote video interface system 100 containing compression/decompression accelerator 120 of the present invention.

Figure 8:
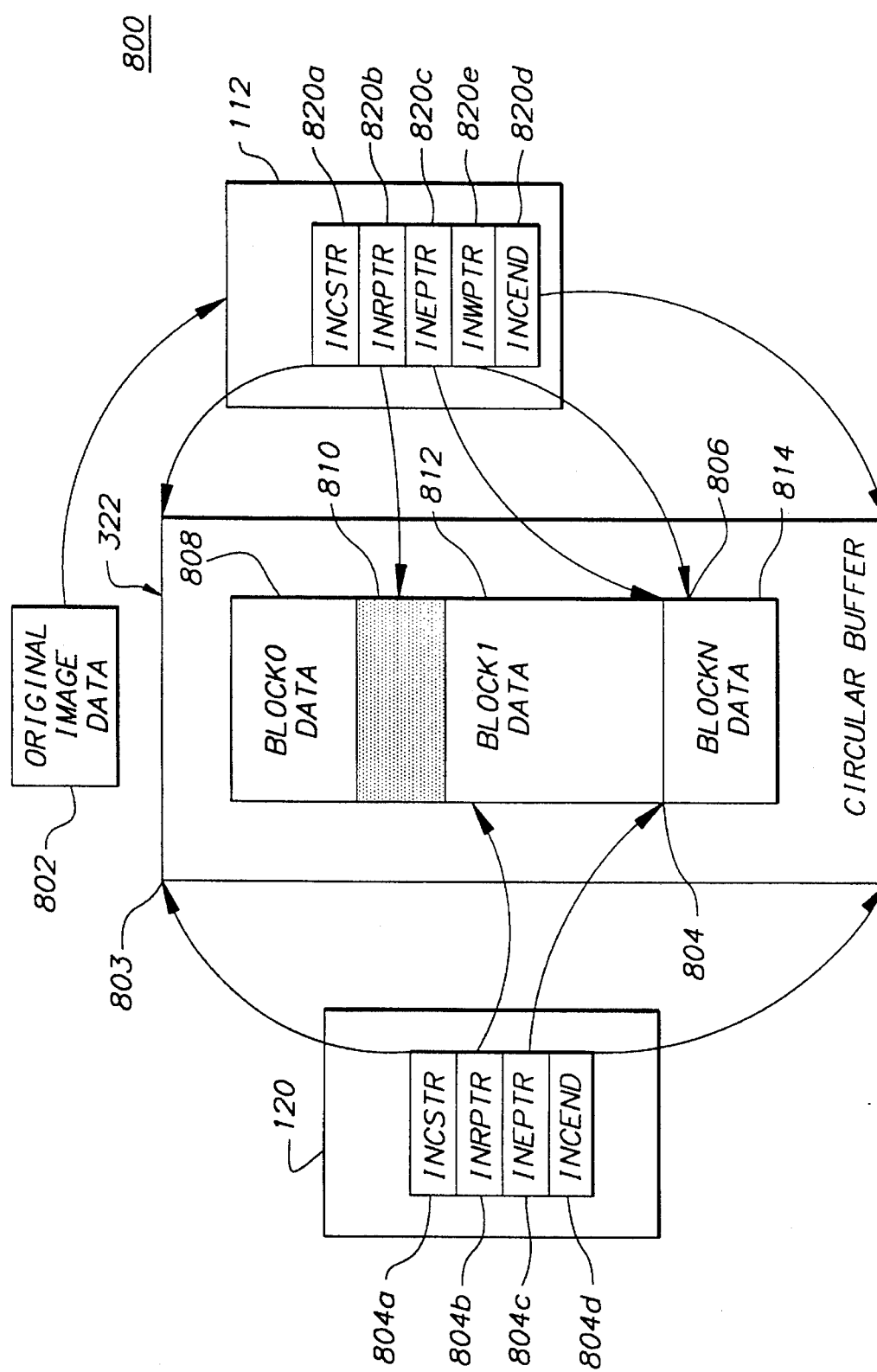
FIG. 8 shows buffer pointers and a block diagram process flow for synchronizing the motion estimation and the encoding process in the system and method of FIG. 2.
Figure 9:
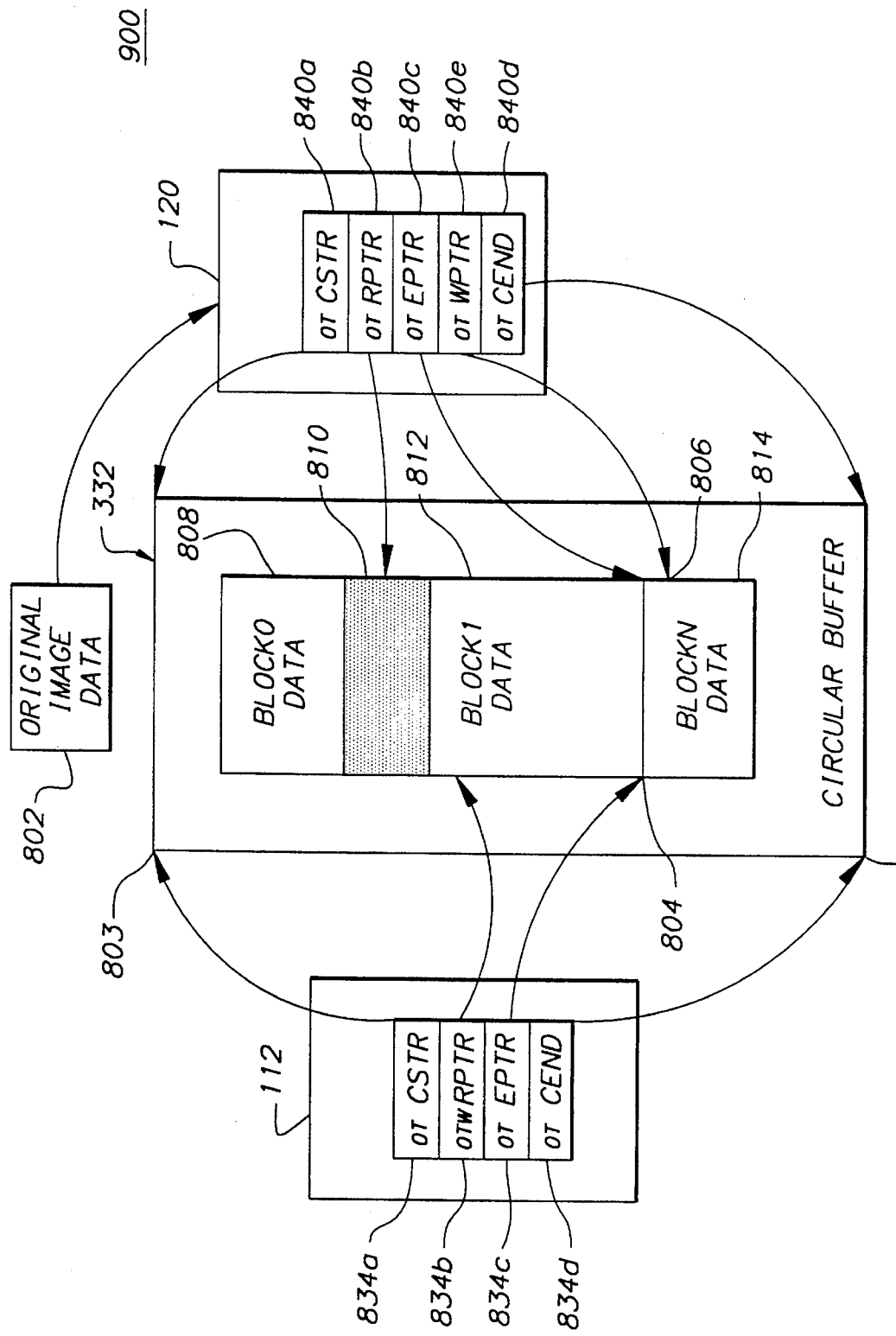
FIG. 9 shows buffer pointers and a block diagram process flow for synchronizing the decoding process in the system and method of FIG. 2.

Referring now to FIGS. 8, 9, there are shown motion estimation/encode synchronization flow 800, 900 as well as various buffer pointers for controlling synchronization flows 800, 900. It will be understood that video processor 112 controls both the encode estimation process and the synchronization of the motion estimation process in accordance with synchronization flows 800, 900.

During the encoding process of encode dataflow 300 compression/decompression accelerator 120 reads block lists of uncompressed image data from encode input circular buffer 322. Accelerator 120 also writes compressed data in the form of run/value pairs into encode output circular buffer 332 within dataflow 300 as previously described. However, it will be understood that encode input circular buffer 322 and encode output circular buffer 332 may be located in the same area of physical memory. Thus access by accelerator 120 to the physical memory storing circular buffers 322, 332 must be synchronized in order to avoid conflicts.

To avoid conflicts whenever there is a reset or some other initial condition within compression/decompression accelerator 120, sets two accelerator 120 input buffer pointers equal to each other. Accelerator INRPTR pointer 804b, which indicates the location from which accelerator 120 is reading input circular buffer 322, is set equal to accelerator INRPTR pointer 804c, which represents end location 804 of current input list 812. Additionally, accelerator 120 sets two output buffer pointers equal to each other. Accelerator OTWPTR pointer 830c which indicates the location at which accelerator 120 is writing to output circular buffer 322, is set equal to the value of accelerator OTEPTR pointer 830e, which indicates the end of the current output list.

Because the beginning and the end of both the current input list and the current output list are thus equal to each other, processing by compression/decompression accelerator 120 within encode dataflow 300 is suspended. It should be noted, however, that bus interface 200 of accelerator 120 may continue to operate because accelerator 120 may be a target in a bus transaction of remote video interface system 100. However, accelerator 120 does not initiate any transactions in this suspended state.

After the above pairs of buffer printers are set equal to each other, video processor 112 defines the areas of encode input circular buffer 322 and encode output circular buffer 332. These buffers are defined by setting a series of memory mapped pointers within compression/decompression accelerator 120 using scaler memory write operations. These pointers include accelerator INCSTR pointer 804a and accelerator INCEND pointer 804d which indicate beginning address 803 and ending address 805, respectively, of encode input circular buffer 322. Additionally, accelerator pointers OTCSTR 830a, OTCEND 830d are set by video processor 112. It will be understood that block 112 must set accelerator pointers 804a, c, d equal to processor pointers 820a, c, d so that accelerator 120 and block 112 may agree regarding where circular buffer 322 begins and ends and where current list 812 ends.

Processor INWPTR pointer 820e indicates location 806 within buffer 322. Location 806 is the location to which block 112 is writing and it has no corresponding pointer within compression/decompression accelerator 120 because accelerator 120 does not write to buffer 322. Accelerator INRPTR 804b and processor INRPTR 820b within block 112 indicate the locations at which accelerator 120 and block 112 are reading input circular buffer 322 and thus will differ from each other. Accelerator INRPTR pointer 804b should point to a location before location 804 marking the end of the list and INRPTR pointer 820b should point to a location after location 804.

Processor block 112 then starts motion estimation and block classification on each block of pixels in accordance with its determinations as previously described with respect to encode dataflow 300. Block 112 then writes the data associated with each block in the circular buffer area, starting with the address indicated by INWPTR pointer 820e.

In the case of a decode of a remote bitstream 601, compression/decompression accelerator 120 reads input data from decode input circular buffer 606 and writes reconstructed data into a frame memory such as decoded image block 608. Under initial conditions, including a reset, accelerator 120 sets two input buffer pointers equal to each other. Accelerator INRPTR pointer 904b, which indicates the position from which accelerator 120 is reading input circular buffer 606, is set equal to accelerator INEPTR pointer 804c, which represents the end of the current input list.

Video processor 112 then defines the areas of encode input circular buffer 606 and encode output circular buffer 608 by setting a series of memory mapped pointers on compression/decompression accelerator 120 using scaler memory write operations. This may be the only time when video processor 112 writes to accelerator 120. These pointers include INCSTR pointer 804a and INCEND pointer 804b which indicate the beginning and ending addresses, respectively, of encode input circular buffer 322. Block 112 then starts the variable length decode process on the compressed data and writes the parsed run/value block data to the circular buffer area.

When enough data is written into the buffer area, processor 112 updates both INEPTR pointers 804c, 820c in compression/decompression accelerator 120 and in processor 112. INEPTR pointers 804c, 820c point to the last location of the data in the buffer area. Compression/decompression accelerator 120 then begins to fetch data at the location programmed into accelerator INCSTR pointer 840a and continues up to and including the location programmed into accelerator INEPTR pointer 804c. When INRPTR pointer 804b equals INEPTR pointer 804c, compression/decompression accelerator 120 stops processing.

INRPTR pointer 804b wraps around when it reaches the address programmed into accelerator INCEND pointer 804d. Processor 112 is responsible for maintaining both INEPTR pointers 804c, 820c. Compression/decompression accelerator 120 is responsible for maintaining accelerator INRPTR pointer 804b. Processor 112 updates its copy of INRPTR pointer 820b by reading accelerator INRPTR pointer 804b within compression/decompression accelerator 120.

Block 112 may write additional blocks into the buffer area by writing the data then updating accelerator INEPTR pointer 804c. When video processor 112 writes this code accelerator INRPTR pointer 804c is also told to insure that processor 112 does not over write the area of circular buffer.

Figure 10:
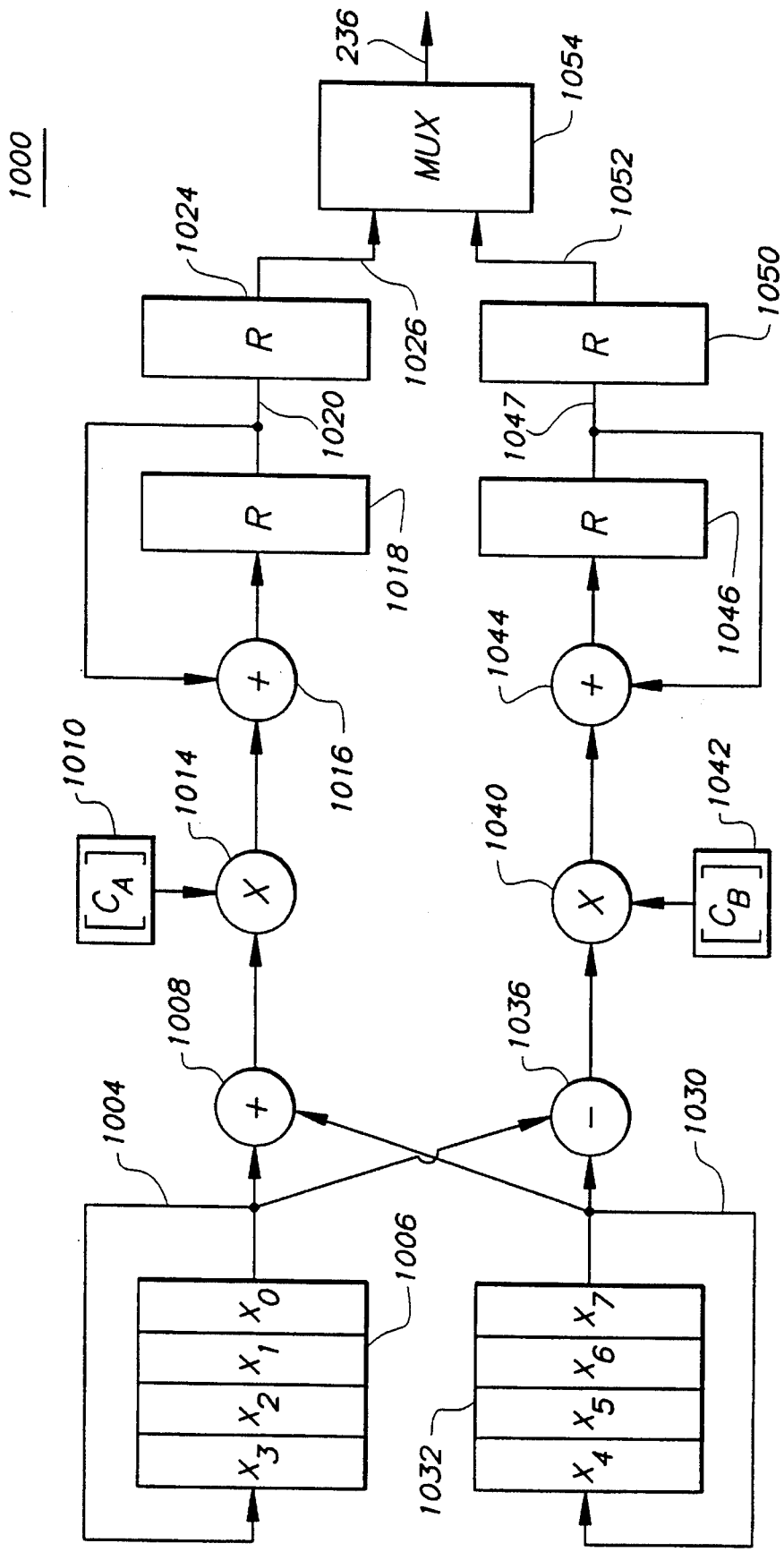
FIG. 10 shows the forward discrete cosine transform computation flow of the encoding portion of the system of FIG. 3.
Figure 11:
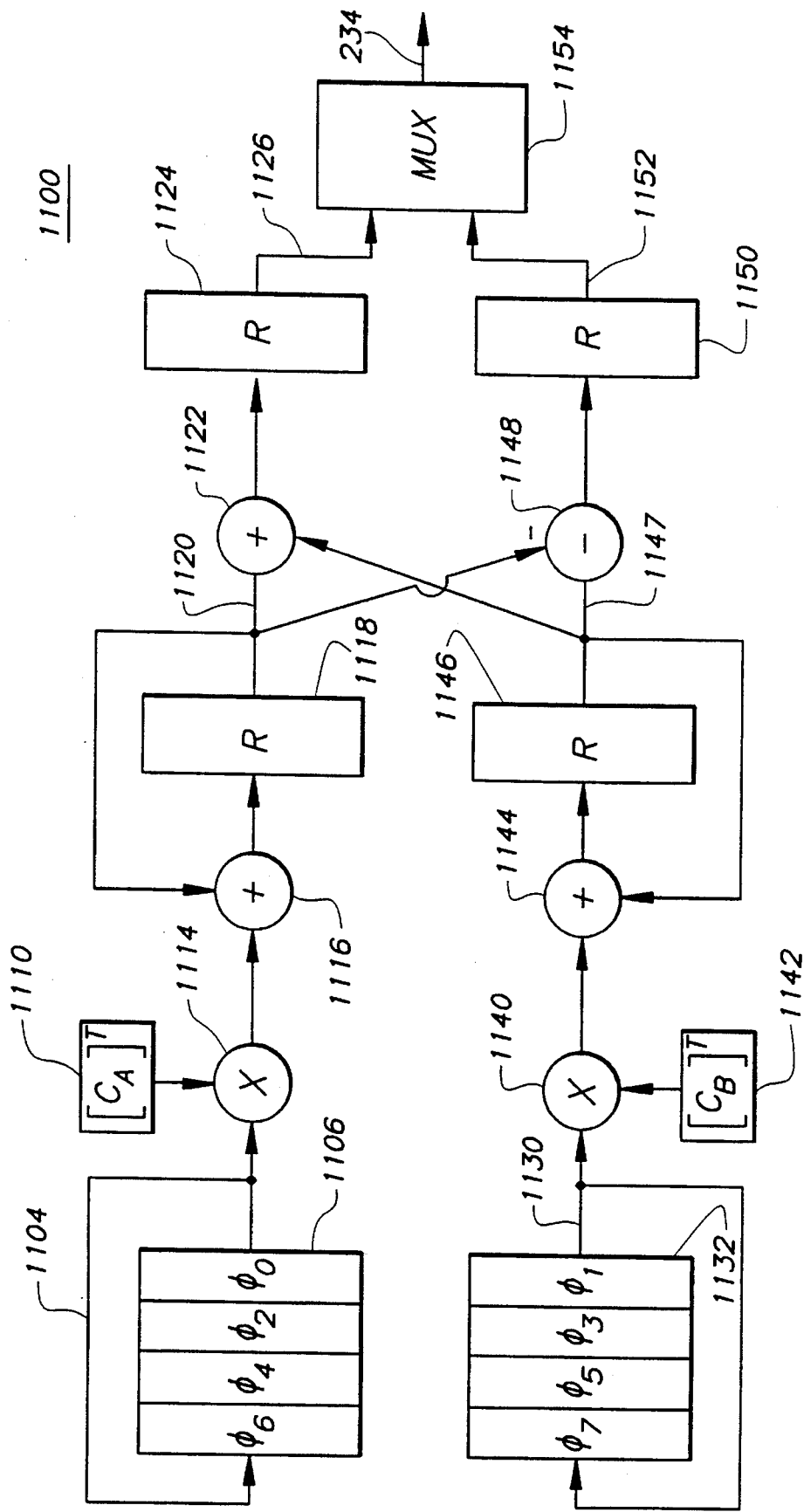
FIG. 11 SHOWS the inverse discrete cosine transform computation flow of the decoding portion of the system of FIG. 3.

Referring now to FIGS. 10, 11, there are shown forward discrete cosine transform computation flow 1000 and inverse discrete cosine transform computation flow 1100 of the present invention. Discrete cosine transform computation flows 1000, 1100 may be performed by transform blocks 230a, b respectively of dataflows 300,600. Additionally discrete cosine transform computation flows 1000, 1100 may be performed by selectable transform block 230 under the control of transform control line 228.

The operation of forward discrete cosine transform computation flow 1000 as performed by transform block 230a of encode dataflow 300 or selectable discrete cosine transform block 230 of compression/decompression accelerator 120 may be expressed as shown in Equation (4):

$$[\Phi]=[C][X].\qquad\text{Equation (4)}$$

In Equation (4) matrix [X] is the input data matrix applied to transform block 230 or transform block 230a, matrix [C] is the discrete cosine transform matrix, and matrix [Φ] is the transformed output matrix which is applied to transform output line 236 by transform block 230.

Inverse discrete cosine transform computation flow 1100 as performed by transform block 230 or by selectable discrete cosine transform block 230 under the control of transform control line 228 may be expressed shown in Equation (5):

$$[X]=[C]^T[\Phi],\qquad\text{Equation (5)}$$

In Equation (5) matrix [Φ] is the transformed input matrix received by way of transform input line 223, matrix [X] is the output matrix applied to transform output line 234 (?), and matrix $[C]^T$ is the inverse discrete cosine transform matrix.

The individual coefficients $c_m$ of the discrete cosine transform matrix [C] may be expressed as:

$$c_m = \sqrt{\frac{1}{n}}\left[k_m\cos\frac{m\pi(2n+1)}{2N}\right].\qquad\text{Equation (6)}$$

In Equation (6) N is the order of the discrete cosine transform performed within transform computation flows 1000, 1100 and m and n are the row and column indices, respectively, of the discrete cosine transform matrix [C] wherein m and n have the values 0, 1, 2, . . . , N–1. The constant $k_m$ has a value of one divided by the square root of two if the row index m has a value of zero. The constant $k_m$ has the value of one if the row index m is not zero.

Solving Equation (6) when the order N of the discrete cosine transform is eight yields the following discrete cosine transform coefficients $c_m$:

$$c_o = 1/\sqrt{2}\qquad\text{Equation (7)}$$

$$c_m = \cos\frac{m\pi}{16}\text{ for }m=1,2,\ldots,7$$

Under these circumstances the discrete cosine transform matrix [C] of Equation (4) may be formed in accordance with Equation (6) and Equations (7) as follows:

$$[C]=\frac{1}{2}\begin{bmatrix} c_0 & c_0 & c_0 & c_0 & c_0 & c_0 & c_0 & c_0 \\ c_1 & c_3 & c_5 & c_7 & -c_7 & -c_5 & -c_3 & -c_1 \\ c_2 & c_6 & -c_6 & -c_2 & -c_2 & -c_6 & c_6 & c_2 \\ c_3 & -c_7 & -c_1 & -c_5 & c_5 & c_1 & c_7 & c_3 \\ c_4 & -c_4 & -c_4 & c_4 & c_4 & -c_4 & -c_4 & c_4 \\ c_5 & -c_1 & c_1 & c_3 & -c_3 & -c_7 & c_1 & -c_5 \\ c_6 & -c_2 & c_2 & -c_6 & -c_6 & c_2 & -c_2 & c_6 \\ c_7 & -c_5 & c_3 & -c_1 & c_1 & -c_3 & c_5 & -c_7 \end{bmatrix}$$

It will be understood that eight multiply/accumulate operations are required to perform this transform for each data point within input data matrix [X]. Therefore 64×8=512 multiply/accumulate operations are required for a one-dimensional discrete cosine transform. For a two-dimensional discrete cosine transform 1024 multiply/accumulate operations are required.

Several fast prior art algorithms are known for performing the forward and inverse discrete cosine transforms of Equation (4) and Equation (5). Using certain of these prior art methods an eight point discrete cosine transform may be performed with twelve multiplies and twenty-nine adds. Thus a total of one hundred ninety-two multiplications and four hundred sixty-four additions are required thereby simplifying the operation of these transforms. These algorithms are better suited for parallel operation.

Forward discrete cosine transform flow 1000 of the present invention executes a fast forward discrete cosine which is a faster and more efficient variation of the transform represented by Equation (4). In forward discrete cosine transform flow 1000, the order N of the transform is eight. It will be understood by those skilled in the art that the transform performed by forward transform flow 1000 is a fast forward transform of the type described with respect to transform block 230a. It is performed by selectable discrete cosine transform block 230 when selectable transform block 230 is in the encode mode. This fast forward transform may be expressed as:

$$\begin{bmatrix}\phi_0\\\phi_2\\\phi_4\\\phi_6\end{bmatrix}=\frac{1}{2}\begin{bmatrix}A & A & A & A\\B & C & -C & -B\\A & -A & -A & A\\C & -B & B & -C\end{bmatrix}\begin{bmatrix}x_0+x_7\\x_1+x_6\\x_2+x_5\\x_3+x_4\end{bmatrix}=\frac{1}{2}[C_A][X']$$

-continued $$\begin{bmatrix} \phi_1 \\ \phi_3 \\ \phi_5 \\ \phi_7 \end{bmatrix} = \frac{1}{2} \begin{bmatrix} D & E & F & G \\ E & -G & -D & -F \\ F & -D & G & E \\ G & -F & E & -D \end{bmatrix} \begin{bmatrix} x_0 + x_7 \\ x_1 + x_6 \\ x_2 + x_5 \\ x_3 + x_4 \end{bmatrix} = \frac{1}{2} [C_B][X'']$$

wherein the elements of submatrices $[C_A]$ and $[C_B]$ are obtained from the discrete cosine transform matrix using sparse matrix factorization techniques known to those skilled in the art and the coefficients of Equations (8) are given by:

$$A = \cos \frac{\pi}{4}$$

$$B = \cos \frac{\pi}{8}$$

$$C = \sin \frac{\pi}{8}$$

$$D = \cos \frac{\pi}{16}$$

$$E = \cos \frac{3\pi}{16}$$

$$F = \sin \frac{3\pi}{16}$$

$$G = \sin \frac{\pi}{16}$$

The elements of vectors [X'] and [X"] or submatrices [X'] and [X"] are formed by respectively adding and subtracting the high order data points of matrix [X] and the low order data points of matrix [X].

Transform computation flow 1000, performed by selectable discrete cosine transform block 230, is effective to receive the input data matrix [X] and apply the forward discrete cosine transform matrix [C] to input data matrix [X] to provide the forward transformed matrix [Φ] as set forth in Equation (4) and Equations (8). In order to perform these operations the low order data points $x_0$–$x_3$ of an input word x are selected to form a subword. These data points may be any number of bits wide. The data points of this subword are placed into circular input registers 1006. Similarly, the high order data points $x_4$–$x_7$ of the input word are selected to form another subword. The data points of this subword are placed into circular input registers 1032.

As data points $x_0$–$x_3$ are successively applied to addition node 1008 and subtraction node 1036 they are also applied to the input of circular registers 1006 by way of a loop formed by register output line 1004. Similarly, data points $x_4$–$x_7$ are successively applied to the input of circular registers 1032 by way of a loop formed by register output line 1030 as they are applied to addition node 1008 and subtraction node 1036.

The timing of the presentation of each of these data points is controlled in a manner understood by those skilled in the art to provide the sums $x_0+x_7$, $x_1+x_6$, $x_2+x_5$, and $x_3+x_4$, which are the elements of submatrix [X'] of Equations (8), at the output of addition node 1008. In a similar manner the differences $x_0-x_7$, $x_1-x_6$, $x_2-x_5$, $x_3-x_4$, which are the elements of submatrix [X"] of Equations (8), are formed at the output of subtraction node 1036. It will be understood that, acting cooperatively, register output lines 1004, 1030 and nodes 1008, 1036 operate as a conventional butterfly adder operating upon a series of pairs of input data points. In a conventional butterfly adder, two inputs are received and two outputs are provided, one output being the sum of the inputs, the other the difference. In the case of flow 1000, these inputs proceed through input circular buffers 1004, 1032 to produce the values of submatrices [X'] and [X"]. The output of nodes 1008, 1036 are then successively applied to multiplication nodes 1014, 1040 within transform computation flow 1000.

The coefficients of submatrix $[C_A]$ are applied to submatrix [X'] received by multiplication node 1014 from addition node 1008 for multiplication within node 1014 in accordance with Equations (8). The coefficients of the submatrix $[C_A]$ are applied to multiplication node 1014 by coefficient register 1010. The matrix partial product terms thus formed by multiplication node 1014 are then applied to addition node 1016 within transform computation flow 1000.

In a similar manner submatrix [X"] received by multiplication node 1040 from subtraction node 1036 is multiplied within node 1040 by the coefficients of submatrix $[C_B]$ in accordance with Equations (8). The coefficients of submatrix $[C_B]$ are applied to multiplication node 1040 by coefficient register 1042. The matrix partial product terms thus formed by multiplication node 1040 are applied to addition node 1044 within transform computation flow 1000.

The sums formed by addition nodes 1016, 1044 are applied to register blocks 1018, 1046, respectively, within forward discrete cosine transform computation flow 1000. The outputs of register blocks 1018, 1046 are applied back to addition nodes 1016, 1044, respectively, by way of register output lines 1020, 1047 causing delayed terms to be summed with terms nearby received by nodes 1016, 1044. This permits transform computation flow 1000 to perform the additions of the partial product terms as required by the matrix algebra operations of Equations (8).

The output of register blocks 1018, 1046 are also applied to register blocks 1024, 1050, respectively, within forward transform computation flow 1000 which may be implemented by selectable discrete cosine transform block 230. It will be understood that the output of register block 1024, which appears on register output line 1026, is the set of even numbered transformed data points $\phi_6$, $\phi_4$, $\phi_2$, $\phi_0$ of Equations (8). Additionally, it will be understood that the output of register block 1050 which appears on register output line 1052 is the set of odd numbered transformed data points $\phi_7$, $\phi_5$, $\phi_3$, $\phi_1$ of Equations (8). The values of register output lines 1026, 1052 are applied to flow output multiplexer 1054 in order to be multiplexed, reordered and applied by way of the forward flow output line 236. It is believed that performing a fast forward discrete cosine transform using the system and method of computation flow 1000 provides a transformed output signal several clock cycles faster than the known prior art.

In this manner the transform of computation flow 1000 may be performed by applying a single multiplier 1014, 1040 to each of the outputs of circular buffers 1006, 1032 as the data circulates from one end into the other by way of the loops of lines 1004, 1030. It will be understood that the data must circulate through circular buffers 1006, 1032 once for each pair of output data points from buffers 1006, 1032.

In a similar manner inverse discrete cosine transform computation flow 1100 of the present invention executes a fast inverse discrete cosine transform wherein the order N of the transform is eight. It will be understood by those skilled in the art that the transform performed by forward transform computation flow 1100 is the type of transform performed by selectable discrete cosine transform block 230 when transform block 230 is in the decode mode. This inverse discrete cosine transform matrix $[C]^T$ may be mathematically expressed as:

$$\begin{bmatrix} x_0 \\ x_1 \\ x_2 \\ x_3 \end{bmatrix} = \frac{1}{2} [C_A]^T \begin{bmatrix} \phi_0 \\ \phi_2 \\ \phi_4 \\ \phi_6 \end{bmatrix} + \frac{1}{2} [C_B]^T \begin{bmatrix} \phi_1 \\ \phi_3 \\ \phi_5 \\ \phi_7 \end{bmatrix} = \frac{1}{2} [C_A]^T [\phi'] + \frac{1}{2} [C_B]^T [\phi'']$$

$$\begin{bmatrix} x_7 \\ x_6 \\ x_5 \\ x_4 \end{bmatrix} = \frac{1}{2} [C_A]^T \begin{bmatrix} \phi_0 \\ \phi_2 \\ \phi_4 \\ \phi_6 \end{bmatrix} - \frac{1}{2} [C_B]^T \begin{bmatrix} \phi_1 \\ \phi_3 \\ \phi_5 \\ \phi_7 \end{bmatrix} = \frac{1}{2} [C_A]^T [\phi'] - \frac{1}{2} [C_B]^T [\phi'']$$

Equation (9)

wherein the submatrices $[C_A]^T$ and $[C_B]^T$ are obtained from the discrete cosine transform matrix using sparse matrix factorization techniques.

Computation flow 1100 of selectable discrete cosine transform block 230 is effective to receive an inverse transformed matrix $[\Phi]$ and apply an inverse discrete cosine transform matrix $[C]^T$ to provide an output data matrix $[X]$. Computation flow 1100 is adapted to be a much faster variation of the transform set forth in Equation (4) and Equations (9). In order to perform these operations the even transformed data points $\phi_0$, $\phi_2$, $\phi_4$, $\phi_6$, of the values of transformed matrix $[\Phi]$ are placed in circular input registers 1106 and the odd transformed data points $\phi_1$, $\phi_3$, $\phi_5$, $\phi_7$ reside in circular input registers 1132.

As even transformed data points $\phi_0$, $\phi_2$, $\phi_4$, $\phi_6$ residing in circular input registers 1104 are successively applied to multiplication node 1114 they are simultaneously applied to the input of circular registers 1106 by register output line 1104. As odd numbered transformed data points $\phi_1$, $\phi_3$, $\phi_5$, $\phi_7$, of circular input registers 1132 are applied to multiplication node 1140 they are also simultaneously applied back to the input of circular registers 1130 by way of a loop formed by register output line 1130.

The value applied to multiplication node 1114 from input registers 1106 is multiplied within multiplication node 1114 by the coefficients of submatrix $[C_A]^T$ in accordance with Equations (8). The coefficients submatrix $[C_A]^T$ are applied to multiplication node 1114 by coefficient register 1110o The product formed by multiplication node 1114 is then applied to addition node 1116.

In a similar manner the value received by multiplication node 1140 from input registers 1130 is multiplied within node 1140 by the coefficients of submatrix $[C_B]^T$ in accordance with Equations (8). The coefficients of submatrix $[C_B]^T$ are applied to multiplication node 1140 from coefficient register 1142. The product thus formed by multiplication node 1140 is applied to addition node 1144.

The sums formed by addition nodes 1116, 1144 are applied to register blocks 1118, 1146, respectively, within inverse discrete cosine transform computation flow 1100. The outputs of register blocks 1118, 1146 are applied back to addition nodes 1116, 1144 by way of register output lines 1120, 1147. In this manner, the various partial product terms of Equations (9) may De provided within transform computation flow 1100.

The output of register blocks 1118, 1146 are also applied to both addition node 1122 and substraction node 1148 by way of register output lines 1120, 1147. In this manner the combinations of the partial product terms required by the matrix algebra of Equations (9) may be performed. The outputs of addition node 1122 and subtraction node 1148 are then applied to register blocks 1124, 1150, respectively, within inverse transform computation flow 1100 which may be implemented by selectable discrete cosine transform block 230.

It will be understood that the output of register block 1124, which appears on register output line 1126, includes the low order bits $x_0$, $x_1$, $x_2$, $x_3$ of Equations (9). Additionally, it will be understood that the output of register block 1150, which appears on line 1152, includes the high order data points $x_4$, $x_5$, $x_6$, $x_7$ of Equations (9). The values of lines 1126, 1152 are applied to output multiplexer 1154 in order to be multiplexed and reordered to be applied to by way of output line 236.

Figure 12:
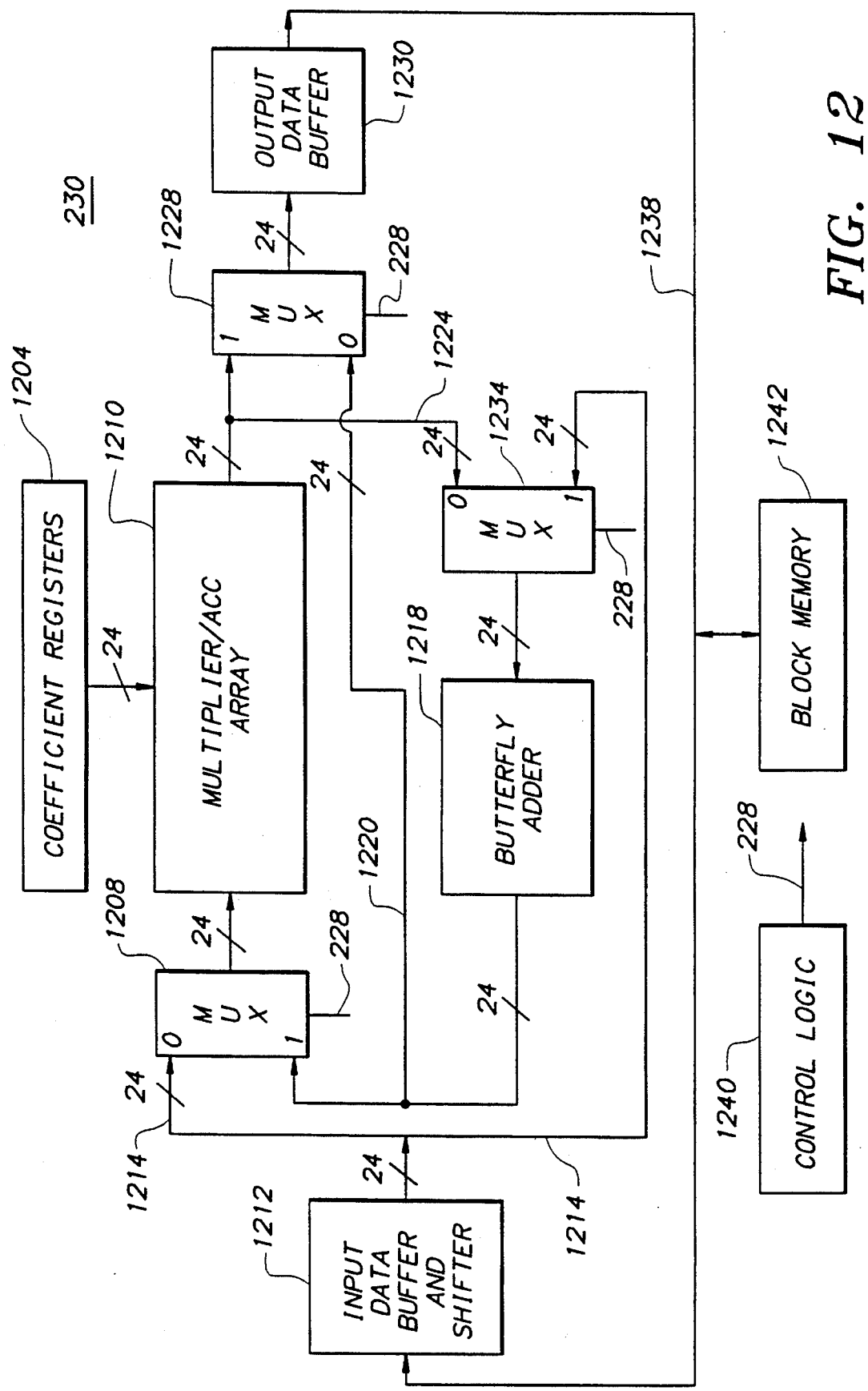
FIG. 12 shows a block diagram representation of a device for performing both the forward and inverse discrete cosine transforms of the system of FIG. 3.

Referring now to FIG. 12, there is shown a block diagram representation of selectable discrete cosine transform block 230 of compression/decompression accelerator 120. It will be understood that selectable discrete cosine transform block 230 is effective to perform the operations of both forward discrete cosine transform computational flow 1000 and inverse discrete cosine transform computational flow 1100 depending upon the control signal applied by Way of transform control line 228.

When compression/decompression accelerator 120 performs the operations of encode dataflow 300, selectable transform block 230 performs the operations of forward transform block 230a. These operations are the ones described with respect to forward discrete cosine transform computational flow 1000. Additionally, when performing the operations of encode dataflow 300 transform block 230 performs the operations of inverse block 230b in order that compression/decompression accelerator 120 provides both an encoded data stream and a data stream representative of the decoding of the encoded data stream. When accelerator 120 performs the operations of decode dataflow 600, selectable discrete cosine transform block 230 performs the operations of inverse transform block 230b as described with respect to inverse computational flow 1100. These selectable encoding and decoding operations are determined by the signal applied to selectable transform block 230 by way of transform control line 228 as previously described.

Within selectable discrete cosine transform block 230 data from block memory 1242 is applied by way of data bus 1238 to input data buffer/shifter 1212. Input data buffer/shifter 1212 is effective to arrange and order input data either as shown with respect to input circular registers 1006, 1032 during a forward transform or as shown with respect to input circular buffers 1106, 1132 during an inverse transform. This arranging and ordering of the input data thus provides input matrices [X'] and [X"] of Equations (8) or input matrices [$\Phi$] and [$\Phi$"] of Equations (9) depending upon whether a forward transform or an inverse transform is performed by selectable discrete cosine transform block 230.

The correctly ordered output of input data buffer/shifter 1212 is applied by way of line 1214 to multiplexers 1208, 1234. Multiplexers 1208, 1234 are controlled by transform control line 228 which selects the encode and decode modes of selectable transform block 230 as previously described. The signal of transform control line 228 is determined according to control logic 1240. Control logic 1240 provides a logic level representative of the operating mode of compression/decompression accelerator 120 according to determinations made by processor block 112 in a manner understood by those skilled in the art.

When selectable transform block 230 is in the decode mode transform control line 228 causes array input multiplexer 1208 to select the data of multiplexer line 1214 and apply the data of line 1214 to multiplier/accumulator array 1210. Thus the input data from buffer/shifter 1212 is applied substantially directly to multiplexer/accumulator array 1210 when selectable transform block 230 is in the decode mode. The coefficient matrices $[C_A]^T$ and $[C_B]^T$ are then applied to array 1210 from coefficient registers 1204 in order that array 1210 may perform the operations of Equations (9) as previously described with respect to inverse computation flow 1100. The output of multiplier/accumulator array 1210 is multiplexed by array output multiplexer 1228 under the control of transform control line 228 into output data buffer 1230. Transformed data in output data buffer 1230 may be transmitted to block memory 1242 by way of bus 1238.

When selectable discrete cosine transform block 230 is in the encode mode, the data selected by array input multiplexer 1208 to be applied to multiplier/accumulator array 1210 is the data on multiplexer input line 1220 rather than the data on multiplexer input line 1214. The data on multiplexer input line 1220 is the output of butterfly adder 1218 or add/subtract device 1218. Butterfly adder receives as its input either (1) the data from input data buffer/shifter 1212 by way of line 1214, or (2) the output of multiplier/ accumulator array 1210. Which of these two data streams is applied to butterfly adder 1218 is determined by multiplexer 1234 under the control of transform control line 228.

Thus the operations performed upon input data by selectable transform block 230 prior to multiplication by the coefficients, as previously described with respect to addition node 1008 and subtraction node 1036, may be performed within selectable transform block 230 when selectable transform block 230 is in the encode mode. This also performs the operations of the feedback loops formed by register output lines 1020, 1046 as well as addition nodes 1016, 1044.

It will therefore be seen that the arithmetic operations of adder 1218 may be applied directly to the input data points provided by buffer/shifter 1212. Alternatively, it may be applied to the input data points provided by buffer/shifter 1212 after the input has been operated upon by the transform coefficients of array 1210. Which of these configurations is provided depends on whether selectable transform block 230 is in the mode for performing one discrete cosine transform or the inverse. It will also be seen that in either mode all functional elements within transform block 230 are used and there is thus no wasted hardware.

For example, the same hardware elements within transform block 230 may serve both as registers 1006 and as registers 1106, as registers 1032 and registers 1132. These registers together may form buffer 1212. Similarly, the same hardware elements within transform block 230 may serve both as adder 1008 and as adder 1122, as subtractor 1036 and subtractor 1148. These arithmetic elements operating cooperatively may serve as butterfly adder 1218. Likewise coefficient matrices [C] and $[C_A]^T$ may be the same hardware circuitry which is merely accessed differently depending on the mode of selectable transform block 230.

Thus selectable transform block 230 requires two multipliers and four adders to perform either the forward or inverse discrete cosine transform, these transforms can be performed by block 230 in sixteen clock cycles. It will be understood that this time may be cut in half by providing two multipliers to operate on the outputs of each buffer 1106, 1132 or each buffer 1006, 1032. However the size of the resulting transform circuit would be twice as large.

I claim:

1. An apparatus for performing a forward or inverse transform of an input signal in response to a transform control signal for indicating whether the forward or inverse transform is to be performed, wherein the transform is characterized by first and second submatrices having coefficients and the input signal comprises a plurality of input signal values, the apparatus comprising:

(a) coefficient register means for storing the coefficients of the first submatrix and the coefficients of a second submatrix;

(b) input circular buffer means for receiving the plurality of input data signal values, for arranging the plurality of input data signal values into first and second signal value subsets having equal numbers of signal values, and for successively providing matched pairs of signal values successively selected from the first and second signal value subsets;

(c) means for receiving successive matched pairs of signal values from the input circular buffer means, for generating a first set of transformed signal values in accordance with the first submatrix, and for generating a second set of transformed signal values in accordance with the second submatrix; and (d) means for generating a plurality of output signal values from the first and second sets of transformed signal values.

2. The apparatus of claim 1, wherein:

the transform is a discrete cosine transform characterized by a full matrix; and the first and second submatrices are derived from the full matrix using sparse matrix factorization.

3. The apparatus of claim 2, wherein:

when the transform control signal indicates that a forward discrete cosine transform is to be performed:
   the plurality of input signal values comprises high order data signal values and low order data signal values;
   the first signal value subset comprises the low order data signal values of the plurality of input signal values;
   the second signal value subset comprises the high order data signal values of the plurality of input signal values;
   means (c) comprises means for multiplying selected coefficients of the first submatrix times corresponding signal value sums, wherein the signal value sums comprise sums of selected signal values of the first and second signal value subsets; and
   means (c) further comprises means for multiplying selected coefficients of the second submatrix times corresponding signal value differences, wherein the signal value differences comprise differences of selected signal values of the first and second signal value subsets; and when the transform control signal indicates that an inverse discrete cosine transform is to be performed:
   the plurality of input signal values comprises odd data signal values and even data signal values;
   the first signal value subset comprises the odd data signal values of the plurality of input signal values;
   the second signal value subset comprises the even data signal values of the plurality of input signal values; and
   means (d) comprises means for generating the plurality of output signal values from transformed signal sum values and transformed signal difference values, wherein:
      the transformed signal sum values comprise sums of selected signal values of the first and second sets of transformed signal values; and
      the transformed signal difference values comprise differences of selected signal values of the first and second sets of transformed signal values.

4. The apparatus of claim 1, further comprising a butterfly adder means, wherein:

when the transform control signal indicates that a forward discrete cosine transform is to be performed:

the plurality of input signal values comprises high order data signal values and low order data signal values;

the first signal value subset comprises the low order data signal values of the plurality of input signal values;

the second signal value subset comprises the high order data signal values of the plurality of input signal values;

the butterfly adder means is for generating signal value sums comprising sums of selected signal values of the first and second signal value subsets;

the butterfly adder means is for generating signal value differences comprising differences of selected signal values of the first and second signal value subsets;

means (c) comprises means for multiplying selected coefficients of the first submatrix times corresponding signal value sums to generate the first set of transformed signal values; and means (c) further comprises means for multiplying selected coefficients of the second submatrix times corresponding signal value differences to generate the second set of transformed signal values; and when the transform control signal indicates that an inverse discrete cosine transform is to be performed:

the plurality of input signal values comprises odd data signal values and even data signal values;

the first signal value subset comprises the odd data signal values of the plurality of input signal values;

the second signal value subset comprises the even data signal values of the plurality of input signal values;

means (c) comprises means for multiplying selected coefficients of the first submatrix times selected signal values of the first signal value subset to generate the first set of transformed signal values;

means (c) further comprises means for multiplying selected coefficients of the second submatrix times selected signal values of the second signal value subset to generate the second set of transformed signal values;

the butterfly adder means is for generating transformed signal sum values comprising sums of selected signal values of the first and second sets of transformed signal values;

the butterfly adder means is for generating transformed signal difference values comprising differences of selected signal values of the first and second sets of transformed signal values; and means (d) comprises means for generating the plurality of output signal values using the transformed signal difference values and the transformed signal sum values.

5. The apparatus of claim 1, further comprising:

(e) a first multiplexer having a first input, a second input, and an output;

(f) a second multiplexer having a first input, a second input, and an output;

(g) a third multiplexer having a first input, a second input, and an output, wherein the first, second, and third multiplexers are controlled by the transform control signal;

(h) a butterfly adder; and (i) an output buffer, wherein:

the output of the input circular buffer means is connected to the first input of the first multiplexer and to the second input of the second multiplexer;

the output of the first multiplexer is connected to the input of the multiplier/accumulator array;

the output of the multiplier/accumulator array is connected to the second input of the third multiplexer and to the first input of the second multiplexer;

the output of the second multiplexer is connected to the input of the butterfly adder;

the output of the butterfly adder is connected to the second input of the first multiplexer and to the first input of the third multiplexer; and the output of the third multiplexer is connected to the input of the output buffer.

6. The apparatus of claim 5, wherein:

the transform is a discrete cosine transform characterized by a full matrix; and the first and second submatrices are derived from the full matrix using sparse matrix factorization.

7. The apparatus of claim 1, further comprising:

(e) a first multiplexer;

(f) a second multiplexer;

(g) a third multiplexer, wherein the first, second, and third multiplexers are controlled by the transform control signal;

(h) a butterfly adder; and (i) an output buffer, wherein:

(1) when the transform control signal indicates that a forward discrete cosine transform is to be performed:

the input circular buffer means transmits the first and second signal value subsets to the second multiplexer, wherein:

the plurality of input signal values comprises high order data signal values and low order data signal values, the first signal value subset comprises the low order data signal values of the plurality of input signal values, and the second signal value subset comprises the high order data signal values of the plurality of input signal values;

the second multiplexer transmits the first and second signal value subsets to the butterfly adder;

the butterfly adder generates signal value sums comprising sums of selected signal values of the first and second signal value subsets;

the butterfly adder generates signal value differences comprising differences of selected signal values of the first and second signal value subsets;

the butterfly adder transmits the signal value sums and signal value differences to the first multiplexer;

the first multiplexer transmits the signal value sums and signal value differences to the multiplier/accumulator array;

the multiplier/accumulator array multiplies selected coefficients of the first submatrix times selected signal value sums and multiplies selected coefficients of the second submatrix times selected signal value differences to generate the first and second sets of transformed signal values;

the multiplier/accumulator array transmits the first and second sets of transformed signal values to the third multiplexer; and the third multiplexer transmits the first and second sets of transformed signal values to the output buffer to generate the plurality of output signal values; and (2) when the transform control signal value indicates that an inverse discrete cosine transform is to be performed:

the input circular buffer means transmits the first and second signal value subsets to the first multiplexer, wherein:

the plurality of input signal values comprises odd data signal values and even data signal values;

the first signal value subset comprises the odd data signal values of the plurality of input signal values, and the second signal value subset comprises the even data signal values of the plurality of input signal values;

the first multiplexer transmits the first and second signal value subsets to the multiplier/accumulator array;

the multiplier/accumulator array multiplies selected coefficients of the first submatrix times selected signal values of the first signal value subset to generate the first set of transformed signal values;

the multiplier/accumulator array multiplies selected coefficients of the second submatrix times selected signal values of the second signal value subset to generate the second set of transformed signal values;

the multiplier/accumulator array transmits the first and second sets of transformed signal values to the second multiplexer;

the second multiplexer transmits the first and second sets of transformed signal values to the butterfly adder;

the butterfly adder generates transformed signal value sums comprising sums of selected signal values of the first and second sets of transformed signal values;

the butterfly adder generates transformed signal value differences comprising differences of selected signal values of the first and second sets of transformed signal values;

the butterfly adder transmits the transformed signal value differences and transformed signal value sums to the third multiplexer;

the third multiplexer transmits the transformed signal value differences and the transformed signal value sums to the output buffer to generate the plurality of output signal values.

8. The apparatus of claim 7, wherein:

the transform is a discrete cosine transform characterized by a full matrix; and the first and second submatrices are derived from the full matrix using sparse matrix factorization.

9. A method for performing a forward or inverse transform of an input signal in response to a transform control signal for indicating whether the forward or inverse transform is to be performed, wherein the transform is characterized by first and second submatrices having coefficients and the input signal comprises a plurality of input signal values, flag method comprising the steps of:

(a) storing with a coefficient register means the coefficients of the first submatrix and the coefficients of a second submatrix;

(b) receiving with an input circular buffer means the plurality of input data signal values, arranging with the input circular buffer means the plurality of input data signal values into first and second signal value subsets having equal numbers of signal values, and successively providing with the input circular buffer means matched pairs of signal values successively selected from the first and second signal value subets;

(c) receiving with a multiplier/adder means successive matched pairs of signal values from the input circular buffer means, generating with the multiplier/adder means a first set of transformed signal values in accordance with the first submatrix, and generating with the multiplier/adder means a second set of transformed signal values in accordance with the second submatrix; and (d) generating a plurality of output signal values from the first and second sets of transformed signal values.

10. The method of claim 9, wherein:

the transform is a discrete cosine transform characterized by a full matrix; and the first and second submatrices are derived from the full matrix using sparse matrix factorization.

11. The method of claim 10, wherein:

when the transform control signal indicates that a forward discrete cosine transform is to be performed:

the plurality of input signal values comprises high order data signal values and low order data signal values;

the first signal value subset comprises the low order data signal values of the plurality of input signal values;

the second signal value subset comprises the high order data signal values of the plurality of input signal values;

step (c) comprises the step of multiplying with the multiplier/adder means selected coefficients of the first submatrix times corresponding signal value sums, wherein the signal value sums comprise sums of selected signal values of the first and second signal value subsets; and step (c) further comprises the step of multiplying with the multiplier/adder means selected coefficients of the second submatrix times corresponding signal value differences, wherein the signal value differences comprise differences of selected signal values of the first and second signal value subsets; and when the transform control signal indicates that an inverse discrete cosine transform is to be performed:

the plurality of input signal values comprises odd data signal values and even data signal values;

the first signal value subset comprises the odd data signal values of the plurality of input signal values;

the second signal value subset comprises the even data signal values of the plurality of input signal values; and step (d) comprises the step of generating the plurality of output signal values from transformed signal sum values and transformed signal difference values, wherein:

the transformed signal sum values comprise sums of selected signal values of the first and second sets of transformed signal values; and the transformed signal difference values comprise differences of selected signal values of the first and second sets of transformed signal values.

12. The method of claim 10, wherein:

when the transform control signal indicates that a forward discrete cosine transform is to be performed:

the plurality of input signal values comprises high order data signal values and low order data signal values;

the first signal value subset comprises the low order data signal values of the plurality of input signal values;

the second signal value subset comprises the high order data signal values of the plurality of input signal values;

further comprising the step of generating with a butterfly adder means signal value sums comprising sums of selected signal values of the first and second signal value subsets;

further comprising the step of generating with the butterfly adder means signal value differences comprising differences of selected signal values of the first and second signal value subsets;

step (c) comprises the step of multiplying with the multiplier/adder means selected coefficients of the first submatrix times corresponding signal value sums to generate the first set of transformed signal values; and step (c) further comprises the step of multiplying with the multiplier/adder means selected coefficients of the second submatrix times corresponding signal value differences to generate the second set of transformed signal values; and when the transform control signal indicates that an inverse discrete cosine transform is to be performed:

the plurality of input signal values comprises odd data signal values and even data signal values;

the first signal value subset comprises the odd data signal values of the plurality of input signal values;

the second signal value subset comprises the even data signal values of the plurality of input signal values;

step (c) comprises the step of multiplying with the multiplier/adder means selected coefficients of the first submatrix times selected signal values of the first signal value subset to generate the first set of transformed signal values;

step (c) farther comprises the step of multiplying with the multiplier/adder means selected coefficients of the second submatrix times selected signal values of the second signal value subset to generate the second set of transformed signal values;

further comprising the step of generating with the butterfly adder transformed signal sum values comprising sums of selected signal values of the first and second sets of transformed signal values;

further comprising the step of generating with the butterfly adder means transformed signal difference values comprising differences of selected signal values of the first and second sets of transformed signal values; and step (d) comprises the step of generating the plurality of output signal values using the transformed signal difference values and the transformed signal sum values.

* * * * *

UNITED STATES PATENT AND TRADEMARK OFFICE
CERTIFICATE OF CORRECTION

PATENT NO. : 5,528,528
DATED : June 18, 1996
INVENTOR(S) : Tuan H. Bui

It is certified that error appears in the above-identified patent and that said Letters Patent is hereby corrected as shown below:

Column 23, line 61, delete "flag" and insert therefor --the--.

Signed and Sealed this

Eleventh Day of March, 1997

Attest:

BRUCE LEHMAN

*Attesting Officer*  *Commissioner of Patents and Trademarks*